(12) United States Patent
Lee et al.

(10) Patent No.: US 12,235,704 B2
(45) Date of Patent: Feb. 25, 2025

(54) ELECTRONIC DEVICE AN METHOD FOR OPERATING ELECTRONIC DEVICE

(71) Applicant: SAMSUNG ELECTRONICS CO., LTD., Suwon-si (KR)

(72) Inventors: Bona Lee, Suwon-si (KR); Jonghyun Han, Suwon-si (KR); Eunjung Huh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/119,353

(22) Filed: Mar. 9, 2023

(65) Prior Publication Data

US 2023/0221785 A1  Jul. 13, 2023

Related U.S. Application Data

(63) Continuation of application No. PCT/KR2021/014923, filed on Oct. 22, 2021.

(30) Foreign Application Priority Data

Oct. 30, 2020  (KR) .......................... 10-2020-0143663

(51) Int. Cl.
*G06F 1/26* (2006.01)
*G06F 1/16* (2006.01)
(Continued)

(52) U.S. Cl.
CPC .......... *G06F 1/3212* (2013.01); *G06F 1/1652* (2013.01); *G06F 1/1677* (2013.01);
(Continued)

(58) Field of Classification Search
CPC .... G06F 1/3212; G06F 1/1652; G06F 1/1677; G06F 1/3206; G06F 2203/04803;
(Continued)

(56) References Cited

U.S. PATENT DOCUMENTS 9,299,314 B2  3/2016  Lee et al.
9,473,605 B2 * 10/2016  Jeon .................. H04M 1/04
(Continued)

FOREIGN PATENT DOCUMENTS

KR  10-2013-0113898  10/2013
KR  10-2014-0054746 A  5/2014
(Continued)

OTHER PUBLICATIONS

International Search Report for PCT/KR2021/014923 mailed Feb. 15, 2022, 3 pages.
(Continued)

*Primary Examiner* — Volvick Derose
(74) *Attorney, Agent, or Firm* — NIXON & VANDERHYE P.C.

(57) ABSTRACT

An electronic device may include a flexible display, a battery, a memory, and a processor operatively connected to the flexible display, the battery, and the memory. The processor may be configured to: when the state of charge of the battery is a specified value or less, identify a current form factor of the flexible display; determine at least one form factor of the flexible display that can reduce power consumption of the battery; and provide information on the at least one form factor of the flexible display. Various other embodiments understood through the specification are also possible.

23 Claims, 41 Drawing Sheets

(51) Int. Cl.
*G06F 1/3206* (2019.01)
*G06F 1/3212* (2019.01)
*G06F 1/3203* (2019.01)
*G06F 1/3287* (2019.01)

(52) U.S. Cl.
CPC .......... *G06F 1/3206* (2013.01); *G06F 1/3203* (2013.01); *G06F 1/3287* (2013.01)

(58) Field of Classification Search
CPC .... G06F 1/1624; G06F 1/1641; G06F 1/1686; G06F 1/1694; G06F 1/3218; G06F 1/3265; G06F 1/3287; G06F 3/0481; G06F 3/04886; G06F 1/3234; G06F 2203/04102; G09F 9/30; G09F 9/301; Y02D 10/00
USPC .......................................................... 713/320
See application file for complete search history.

(56) References Cited

U.S. PATENT DOCUMENTS

| | | | |
|---|---|---|---|
| 10,452,171 | B2 | 10/2019 | Jung et al. |
| 10,831,293 | B2 | 11/2020 | Jung et al. |
| 10,866,694 | B2 | 12/2020 | Kim et al. |
| 11,093,203 | B2 | 8/2021 | Park et al. |
| 11,282,476 | B2 | 3/2022 | Xun et al. |
| 11,294,554 | B2 | 4/2022 | Kim |
| 2006/0238494 | A1 | 10/2006 | Narayanaswami et al. |
| 2008/0247128 | A1 | 10/2008 | Khoo et al. |
| 2014/0118271 | A1* | 5/2014 | Lee ....................... G06F 3/0488 345/173 |
| 2018/0018753 | A1* | 1/2018 | McLaughlin ......... G06F 1/1626 |
| 2018/0018929 | A1 | 1/2018 | Xun et al. |
| 2018/0039387 | A1* | 2/2018 | Cheong ................. G06F 1/1652 |
| 2018/0088633 | A1* | 3/2018 | Whitman .............. G06F 1/1677 |
| 2019/0042066 | A1 | 2/2019 | Kim et al. |
| 2019/0130795 | A1 | 5/2019 | Yang et al. |
| 2019/0278465 | A1 | 9/2019 | Zhou et al. |
| 2020/0183480 | A1* | 6/2020 | Zhang ................... G06F 1/3234 |
| 2020/0209924 | A1* | 7/2020 | Zuo ..................... G06F 3/04883 |
| 2020/0301641 | A1* | 9/2020 | Park ....................... G06F 3/1423 |
| 2021/0173533 | A1 | 6/2021 | Kim et al. |
| 2021/0271378 | A1* | 9/2021 | Kim ..................... G06F 3/0482 |
| 2023/0291218 | A1* | 9/2023 | Han .................. H02J 7/007182 |

FOREIGN PATENT DOCUMENTS

| | | |
|---|---|---|
| KR | 10-2016-0080466 | 7/2016 |
| KR | 10-2017-0093658 A | 8/2017 |
| KR | 10-2017-0100951 | 9/2017 |
| KR | 2018-85088 | 5/2018 |
| KR | 10-2114312 | 6/2020 |
| KR | 10-2020-0112378 | 10/2020 |
| KR | 10-2358110 | 2/2022 |

OTHER PUBLICATIONS

Written Opinion of the ISA for PCT/KR2021/014923 mailed Feb. 15, 2022, 4 pages.

Korean Office Action dated Jan. 8, 2025 for KR Application No. 10-2020-0143663.

* cited by examiner

| OUT-FOLDABLE | |
|---|---|
| A | B |
| ACCELERATION/GYRO | CAMERA |
| FIRST ILLUMINANCE | SECOND ILLUMINANCE |
| FINGERPRINT RECOGNITION | PROXIMITY |

| IN-FOLDABLE | | |
|---|---|---|
| A | B1 | B2 |
| OUTER CAMERA | – | INNER CAMERA |
| REAR CAMERA | BAROMETRIC PRESSURE | – |
| GEOMAGNETIC | FIRST ACCELERATION/GYRO | SECOND ACCELERATION/GYRO |
| THIRD ILLUMINANCE | FIRST ILLUMINANCE | SECOND ILLUMINANCE |
| MIC | – | – |

| IN-FOLDABLE | | |
|---|---|---|
| A | B1 | B2 |
| OUTER CAMERA | - | INNER CAMERA |
| REAR CAMERA | BAROMETRIC PRESSURE | - |
| GEOMAGNETIC | FIRST ACCELERATION/GYRO | SECOND ACCELERATION/GYRO |
| THIRD ILLUMINANCE | FIRST ILLUMINANCE | SECOND ILLUMINANCE |
| MIC | - | - |

| IN-FOLDABLE | | |
|---|---|---|
| A | B1 | B2 |
| OUTER CAMERA | - | INNER CAMERA |
| REAR CAMERA | BAROMETRIC PRESSURE | - |
| GEOMAGNETIC | FIRST ACCELERATION/GYRO | SECOND ACCELERATION/GYRO |
| THIRD ILLUMINANCE | FIRST ILLUMINANCE | SECOND ILLUMINANCE |
| MIC | - | - |

| | SLIDABLE/ROLLABLE | | | |
|---|---|---|---|---|
| | A | B | C | D |
| | OUTER CAMERA | INNER CAMERA | | |
| | REAR CAMERA | BAROMETRIC PRESSURE | | |
| | GEOMAGNETIC | FIRST ACCELERATION/GYRO | SECOND ACCELERATION/GYRO | THIRD ACCELERATION/GYRO |
| | THIRD ILLUMINANCE | FIRST ILLUMINANCE | SECOND ILLUMINANCE | THIRD ILLUMINANCE |
| | MIC | - | - | - |

FIG. 19A

ELECTRONIC DEVICE AN METHOD FOR OPERATING ELECTRONIC DEVICE

CROSS-REFERENCE TO RELATED APPLICATIONS

This application is a continuation of International Application No. PCT/KR2021/014923, filed on Oct. 22, 2021, designating the United States, in the Korean Intellectual Property Receiving Office, and claiming priority to KR 10-2020-0143663 filed on Oct. 30, 2020, the disclosures of which are all hereby incorporated by reference herein in their entireties.

BACKGROUND

Field

Certain example embodiments relate to an electronic device including a flexible display and/or a method of operating the electronic device.

Description of Related Art

Recently, various types of electronic devices are being developed and spread. In particular, mobile devices having various functions, such as smart phones, tablet PCs, and wearable devices, as well as existing desktop PCs, are expanding. In addition, with the development of technology, not only electronic devices having a fixed display, but also electronic devices including a physically bendable or foldable flexible display are being developed and spread.

Conventionally, a method of reducing the brightness of a display of an electronic device has been used to reduce power consumption of a battery. However, the method of adjusting the brightness of the entire display does not consider the characteristics of an electronic device including a flexible display and cannot effectively reduce battery power consumption.

SUMMARY

Certain example embodiments provide an electronic device capable of providing information related to a form factor of a flexible display enabling reduction in power consumption of a battery.

An electronic device according to an example embodiment may include a flexible display, a battery, a memory, and a processor operatively connected, directly or indirectly, to the flexible display, the battery and the memory. According to an embodiment, the memory may store instructions that, when executed, cause the processor to identify a current form factor of the flexible display when a remaining battery level of the battery is less than or equal to a specified value, determine at least one form factor of the flexible display enabling reduction in power consumption of the battery, and provide information related to the at least one form factor of the flexible display.

Further, a method for operating an electronic device including a flexible display according to an example embodiment may include identifying a current form factor of the flexible display when a remaining battery level of the battery is less than or equal to a specified value, determining at least one form factor of the flexible display enabling reduction in power consumption of the battery, and providing information related to the at least one form factor of the flexible display.

Further, a recording medium according to an example embodiment may have computer-readable instructions stored therein, which, when executed by an electronic device including a flexible display, cause the electronic device to identifying a current form factor of the flexible display when a remaining battery level of the battery is less than or equal to a specified value, determining at least one form factor of the flexible display, capable of reducing power consumption of the battery, and providing information related to the at least one form factor of the flexible display.

According to certain example embodiments, it is possible to provide information related to the form factor of a flexible display enabling reduction in power consumption of a battery of an electronic device.

According to certain example embodiments, it is possible to reduce power consumption of a battery based on at least a part of an application being executed, a sensor being used and a function being executed in an electronic device, determine a form factor of a flexible display enabling effective use of the battery and provide information related to the form factor.

In addition, various effects may be provided that are directly or indirectly understood through the disclosure.

BRIEF DESCRIPTION OF DRAWINGS

The above and other aspects, features, and advantages of certain example embodiments will be more apparent from the following detailed description, taken in conjunction with the accompanying drawings, in which:

FIGS. 19A and 19B are diagrams for describing an operation of an electronic device according to an example embodiment.

In the description of the drawings, the same or similar reference numerals may be used for the same or similar components.

DETAILED DESCRIPTION

Figure 1:
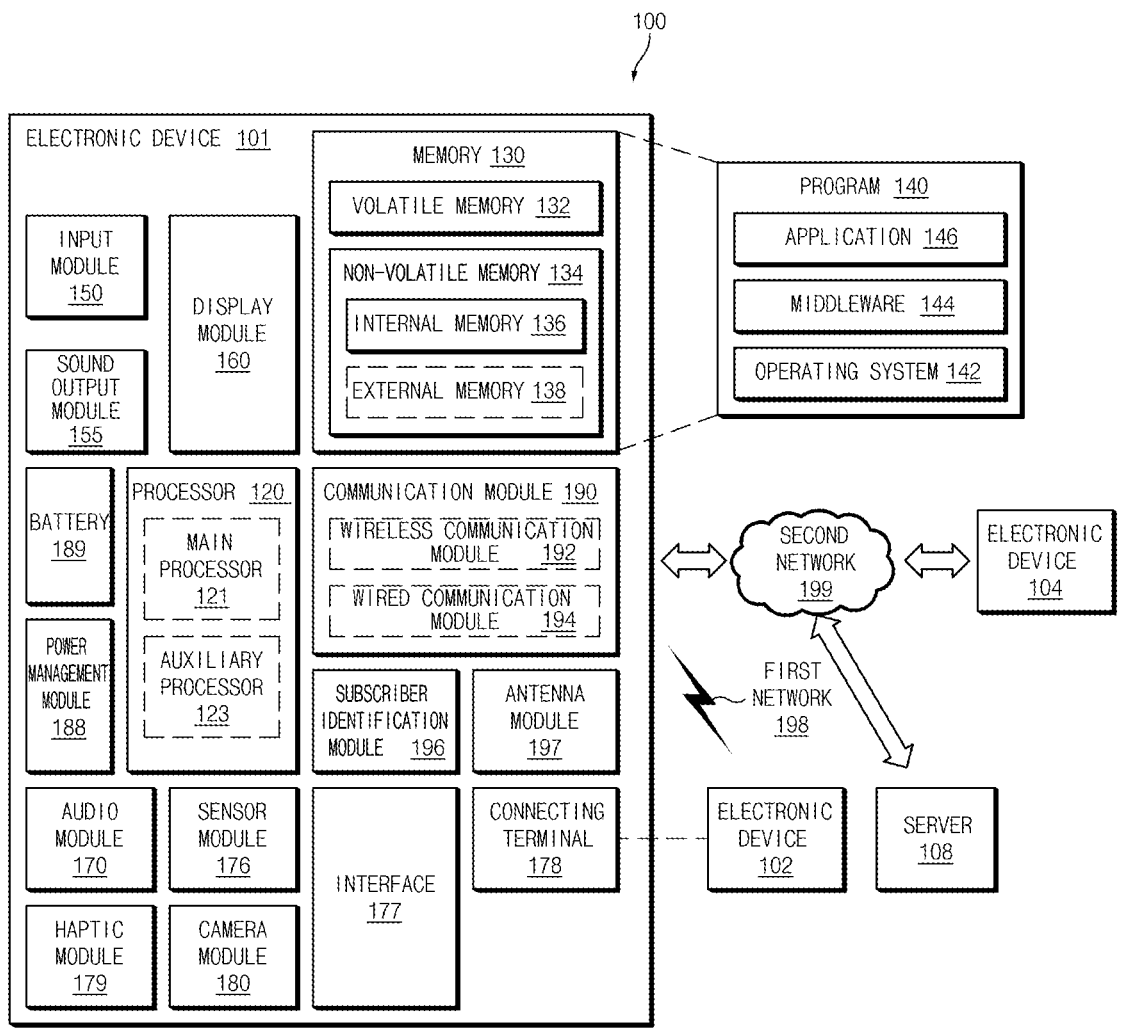
FIG. 1 illustrates an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 (comprising communication circuitry) may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
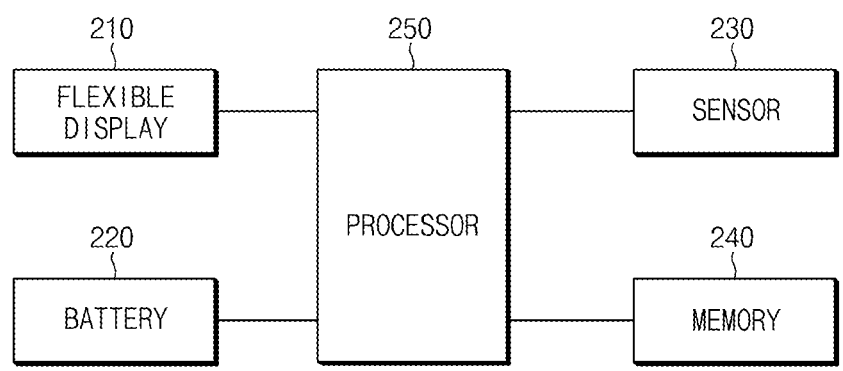
FIG. 2 is a block diagram of an electronic device according to an example embodiment.

FIG. 2 is a block diagram of an electronic device according to an embodiment.

According to an embodiment, an electronic device 200 (e.g., the electronic device 101 of FIG. 1) may include a flexible display 210 (e.g., the display module 160 comprising a display), a battery 220 (e.g., the battery 189 of FIG. 1), at least one sensor 230 (e.g., the sensor module 176 comprising at least one sensor, the input module 150 comprising circuitry, or the camera module 180 comprising a camera of FIG. 1), a memory 240 (e.g., the memory 130 of FIG. 1), and a processor 250 (e.g., the processor 120 of FIG. 1 which of course comprises processing circuitry).

According to various embodiments, the flexible display 210 may visually provide information to the outside of the electronic device 200 (e.g., a user). According to various embodiments, the flexible display 210 may include at least one of a foldable display, a slidable display, and a rollable display. According to an embodiment, the electronic device 200 may further include a sub-display. According to an embodiment, the flexible display 210 may have various form factors. For example, the form factors may refer to various forms of the flexible display 210. For example, a folded or unfolded form of a foldable display, an expanded or non-expanded form of a slidable display, or an expanded or contracted from of a rollable display may each be a form factor of a flexible display.

According to an embodiment, the battery 220 may supply power to at least one component of the electronic device 200.

According to an embodiment, the at least one sensor 230 may include at least one of a gesture sensor, a gyro sensor, an barometric pressure sensor, a geomagnetic sensor, an angle sensor, a magnetic sensor, an acceleration sensor, a grip sensor, a proximity sensor, a color sensor, an IR (infrared) sensor, a biological sensor, a temperature sensor, a humidity sensor, an illuminance sensor, an acoustic sensor (e.g., a microphone), and an image sensor (e.g., a camera).

According to an embodiment, the memory 240 may include instructions for controlling the operation of the electronic device 200 when executed by the processor 250. According to an embodiment, the memory 240 may include various information or data necessary for the operation or function of the electronic device 200.

According to an embodiment, the processor 250 may identify a current form factor of the flexible display 210 when the remaining battery level of the battery 220 is equal to or less than a specified value. For example, the processor 250 may determine whether the flexible display 210 is currently in an unfolded state, a folded state, an expanded state, or a contracted state.

According to various embodiments, the processor 250 may determine a form factor of the flexible display 210 enabling reduction in power consumption of the battery 220. For example, the processor 250 may determine at least one form factor enabling reduction in power consumption of the battery 220 from among various form factors that the flexible display 210 is able to have. According to various embodiments, the processor 250 may determine a form factor of the flexible display 210 enabling reduction in power consumption of the battery 220 while maintaining an operation or function of the electronic device 200.

According to an embodiment, the processor 250 may determine a form factor enabling reduction in power consumption of the battery 220 based on the position of the activated sensor 230. For example, the sensors 230 included in the electronic device 200 may be disposed at specific positions of the electronic device 200. For example, the processor 250 may determine a form factor enabling reduction in power consumption of the battery 220 while maintaining the function (operation) of the activated sensor 230. For example, the processor 250 may determine a form factor using a portion of the flexible display 210 corresponding to the position of the activated sensor 230.

According to an embodiment, the processor 250 may determine a form factor enabling reduction in power consumption of the battery 220 based on at least a part of an application and function being executed. For example, the processor 250 may determine a hardware component (e.g., the sensor 230) corresponding to a function used by an application being executed, and determine a form factor suitable for performing the function of the corresponding hardware component. For example, the processor 250 may determine a form factor based on the type of an application being executed. For example, the processor 250 may determine a form factor suitable for an application based on whether the application is an application that supports a portrait view by default (e.g., a game application or a video-related application) or an application that natively supports a landscape view by default (e.g., a social network service (SNS) application, an instant message (IM) application or a browsing application).

According to an embodiment, the processor 250 may recognize a display ratio of content being displayed on the flexible display 210 and determine a form factor enabling reduction in power consumption of the battery 220 based on the recognized display ratio. For example, the processor 250 may determine a form factor enabling reduction in power consumption of the battery 220 while allowing the aspect ratio of content being displayed to remain the same or change similarly.

According to an embodiment, when the electronic device 200 includes a plurality of displays (e.g., the flexible display 210 and a sub-display (not shown)), the processor 250 may identify current form factors of all the plurality of displays, and then determine at least one form factor enabling reduction in power consumption of the battery 220 among various form factors configurable through a plurality of displays.

According to an embodiment, the processor 250 may provide information related to the determined at least one form factor. For example, the processor 250 may output information related to the determined at least one form factor through the flexible display 210. According to an embodiment, information related to the form factor may include information on an expected use time of the battery 220 for each form factor.

According to an embodiment, the processor 250 may provide information on a method for reducing power consumption of the battery 220 when there is no form factor of the flexible display 210 enabling reduction in power consumption of the battery 220. For example, the processor 250 may provide information on a use state of an application being executed and terminate execution of the selected application based on a user input.

According to an embodiment, the processor 250 may change the form factor of the flexible display 210 to a selected form factor based on a user input for selecting one of at least one form factor enabling reduction in power consumption of the battery 220. For example, the processor 250 may fold, unfold, expand or contract the form of the flexible display 210 to have a form factor selected by a user input.

According to an embodiment, the processor 250 may switch the mode of the electronic device 200 to a power save mode in the case of changing the form factor of the flexible display 210. According to an embodiment, the power saving mode may be a mode for reducing power consumption of the battery 220. For example, in the power saving mode, the processor 250 may reduce the brightness or resolution of the flexible display 210 compared to a normal mode, or limit the processing speed of the processor 250 (e.g., CPU speed) to a specified value or less. For example, in the power saving mode, the processor 250 may limit the use of data in the background or perform control such that at least a portion of the flexible display 210 are turned off. For example, in the power saving mode, the processor 250 may limit or deactivate at least some functions (e.g., an always on display (AOD) function) of the electronic device 200 or operations of at least some components.

According to various embodiments, the electronic device 200 may further include at least some of the components of the electronic device 101 of FIG. 1.

FIGS. 3A to 3D illustrate examples of an electronic device including a flexible display according to various embodiments.

According to various embodiments, an electronic device 310, 320, 330, or 340 (e.g., the electronic device 101 of FIG. 1 or the electronic device 200 of FIG. 2) may include at least one flexible display. For example, the flexible display may include a foldable display, a slidable display, and a rollable display.

Figure 3A:
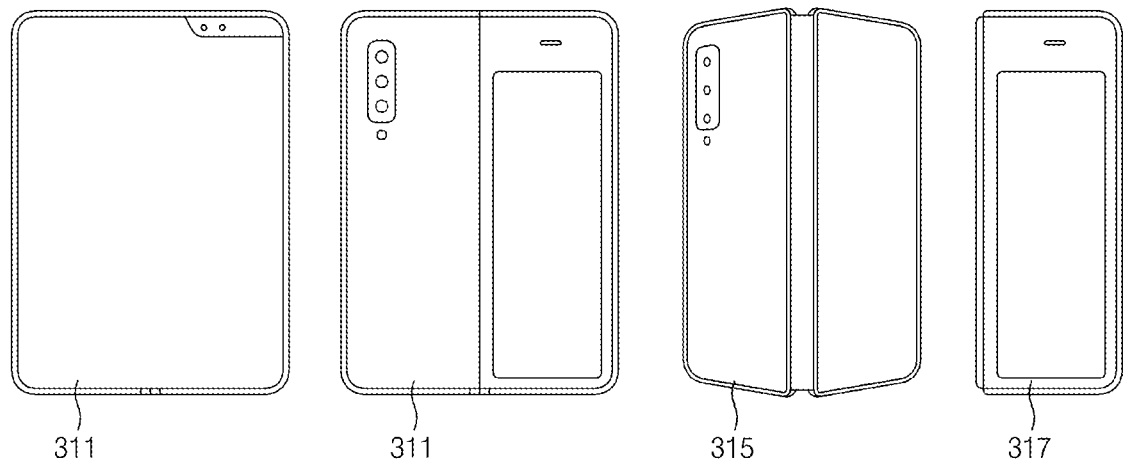
FIGS. 3A, 3B, 3C, and 3D illustrate examples of an electronic device including a flexible display according to various example embodiments.

Referring to FIG. 3A, the electronic device 310 may include a foldable display (e.g., an in-foldable main display) disposed inside with respect to a folding point and a front display (e.g., a front display (sub-display)) disposed outside with respect to a folding point. For example, the electronic device 310 may have a form factor in which the foldable display is unfolded, as indicated by reference numeral 311, and the front display may be used when the foldable display is unfolded, as indicated by reference numeral 312. For example, the electronic device 310 may have a form factor in which the foldable display is folded at a certain angle, as indicated by reference numeral 315, or may have a form factor in which the front display is used in a completely folded state, as indicated by reference numeral 317.

Figure 3B:
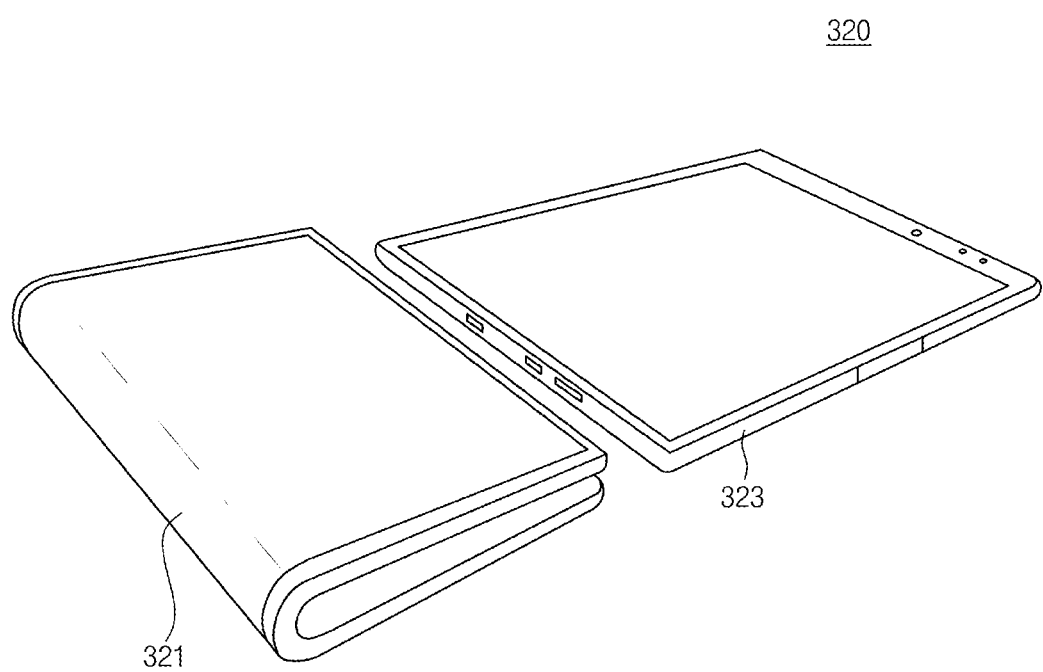

Referring to FIG. 3B, the electronic device 320 may include a foldable display (e.g., an out-foldable display). For example, the foldable display of the electronic device 320 may have a form factor in which the foldable display is folded as indicated by reference numeral 321 and a form factor in which the foldable display is unfolded as indicated by reference numeral 323.

Figure 3C:
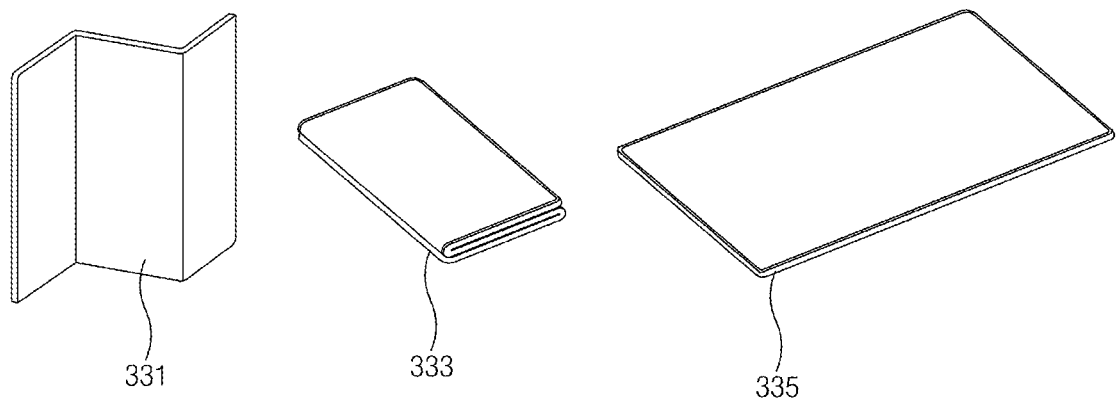

Referring to FIG. 3C, the electronic device 330 may include a foldable display (e.g., z-foldable display) including a plurality of foldable parts (e.g., hinges). For example, the foldable display of the electronic device 330 may have a form factor in which the foldable display is folded at a certain angle, as indicated by reference numeral 331, a form factor in which the foldable display is folded completely, as indicated by reference numeral 333, and a form factor in which the foldable display is unfolded, as indicated by reference numeral 335.

Figure 3D:
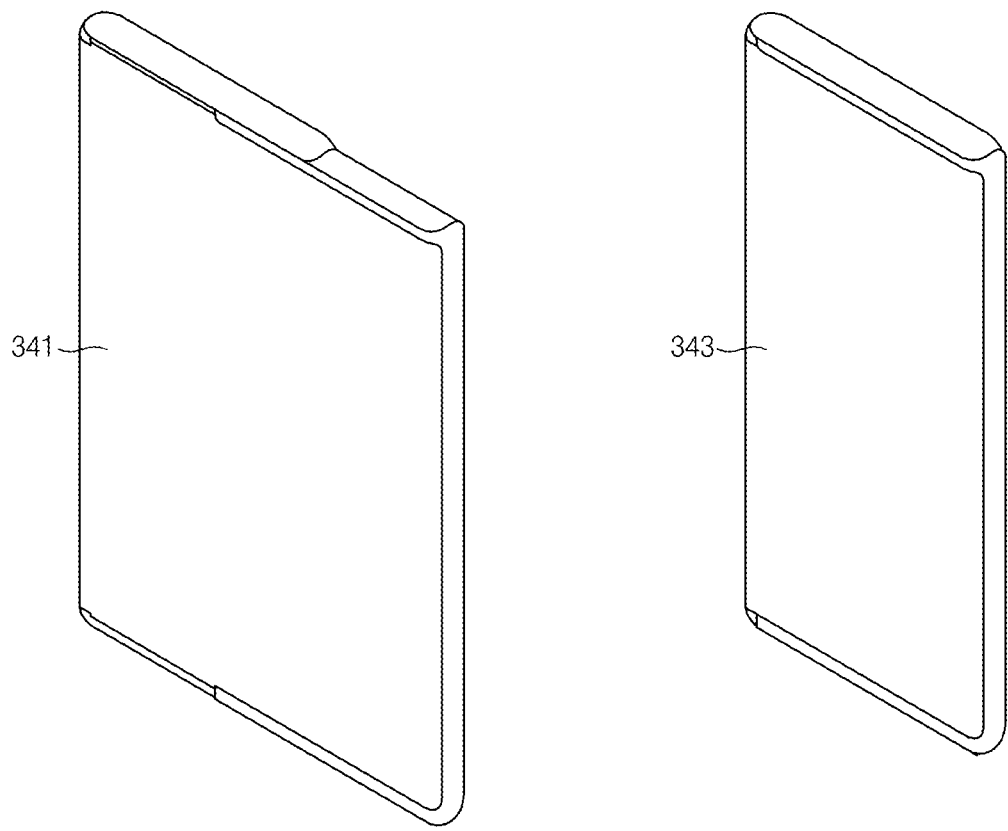

Referring to FIG. 3D, the electronic device 340 may include a slidable display or a rollable display. For example, the slidable display (or rollable display) of the electronic device 340 may have a form factor in which the foldable display is expanded as indicated by reference numeral 341 and a form factor in which the foldable display is contracted as indicated by reference numeral 343.

The forms (form factors) of the flexible displays of the electronic device 310, 320, 330, and 340 shown in FIGS. 3A, 3B, 3C, and 3D are examples and are not limited thereto.

Figure 4A:
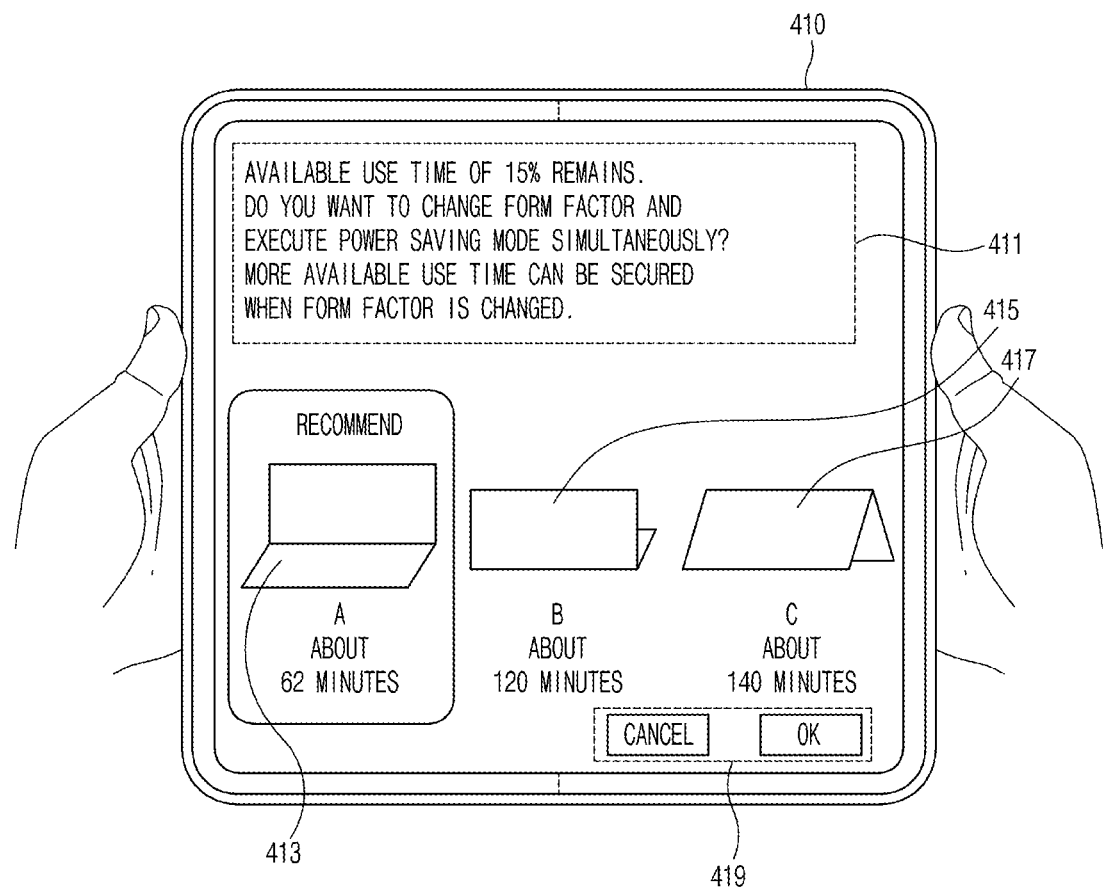
FIGS. 4A, 4B and 4C show examples of information related to form factors of a flexible display enabling reduction in power consumption of a battery provided by an electronic device according to various example embodiments.
Figure 4B:
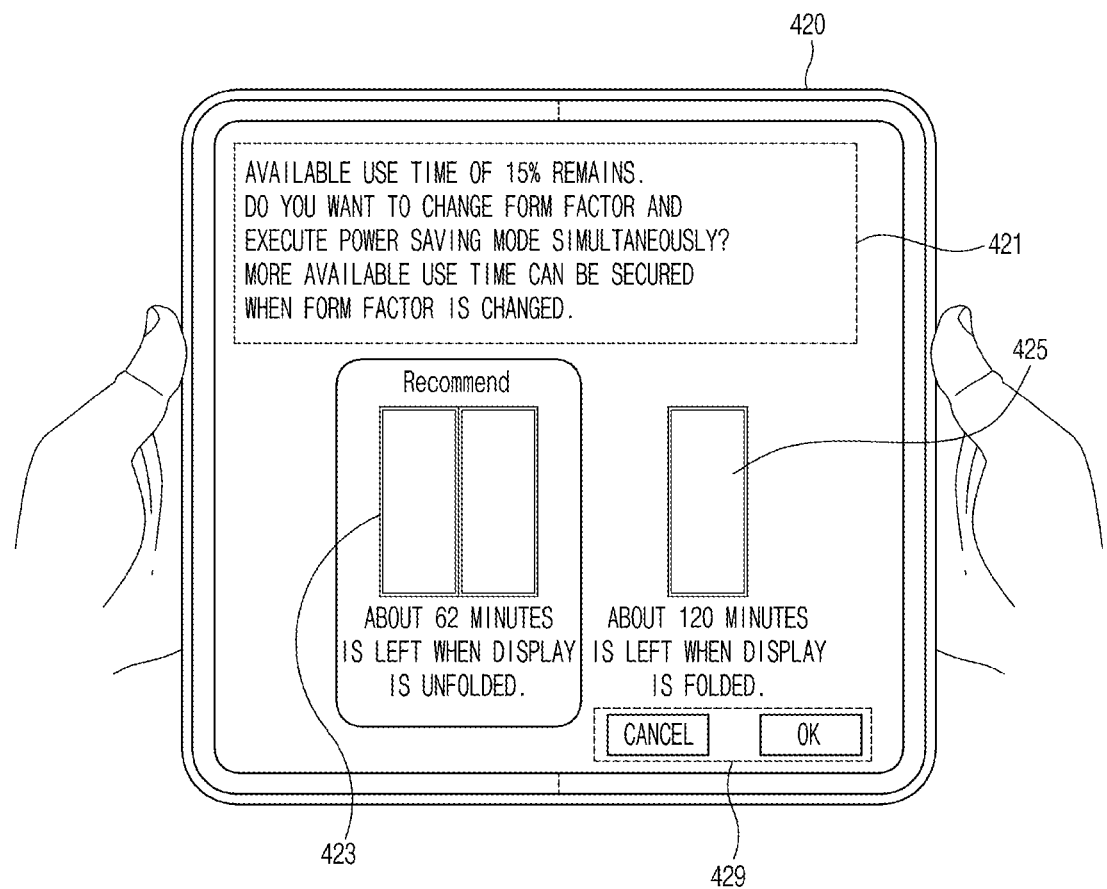
Figure 4C:
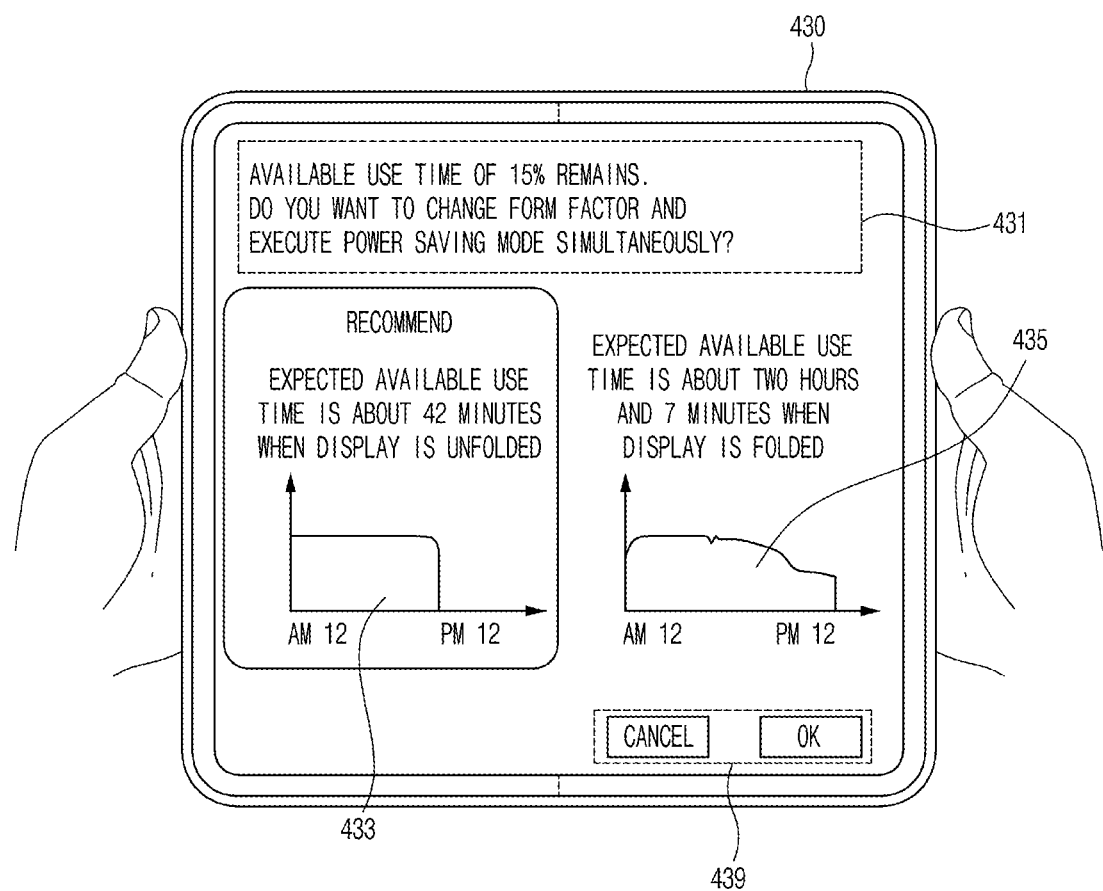

FIGS. 4A to 4C show examples of information related to form factors of a flexible display enabling reduction in power consumption of a battery provided by an electronic device (e.g., the electronic device 101 of FIG. 1 or the electronic device 200 of FIG. 2) according to various embodiments. For example, FIGS. 4A to 4C show information provided by the electronic device when the flexible display of the electronic device is divided into two areas through one folded portion.

For example, referring to FIG. 4A, the electronic device may display a window 410 indicating information related to a form factor when the remaining battery level of a battery is less than or equal to a specified value (e.g., the remaining battery level is 15%). For example, the window 410 may display a guide 411 indicating that it is possible to change a form factor or switch to a power saving mode to reduce battery consumption and increase a usable time, along with information on a remaining battery level or the usable time. For example, the window 410 may include information 413, 415, or 417 on at least one form factor enabling reduction in power consumption of a battery. For example, the information 413, 415, of 417 on the form factor may include an image representing the type of a form factor of the flexible display and information on an available battery use time for each form factor. For example, FIG. 4A illustrates a case in which the electronic device provides information 413, 415, and 417 of three form factors in which the flexible display is folded at a certain angle. For example, the window 410 may include an indication indicating information on a recommended form factor (e.g., 413) among the information 413, 415, and 417 on the form factors. For example, the window 410 may include a button area 419 for closing the window (e.g., when the user does not select a form factor) or confirming selection of a specific form factor.

As another example, referring to FIG. 4B, a window 420 showing information related to the form factor may include a guide 421 indicating that it is possible to change a form factor or switch to a power saving mode to reduce battery consumption and increase an available use time, along with information on the available use time and a button area 429 for closing the window 420 or confirming the selection of a specific form factor. For example, the window 420 may include information 423 or 425 of at least one form factor enabling reduction in battery power consumption. For example, FIG. 4B illustrates a case in which the electronic device provides information 423 on a form factor in which a flexible display is fully unfolded and information 435 on a form factor in which a flexible display is fully folded.

As another example, referring to FIG. 4C, a window 430 may include a guide 431 recommending a change of a form factor, the information 433 or 435 on at least one form factor enabling reduction in battery power consumption, and a button area 439. For example, the information 433 and 435 on the form factor may include a description for the form factor, an expected use time, and a graph showing an expected change in battery usage.

According to various embodiments, types of information on the form factor provided by the electronic devices shown in FIGS. 4A to 4C are examples and are not limited to those shown in FIGS. 4A to 4C.

Figure 5A:
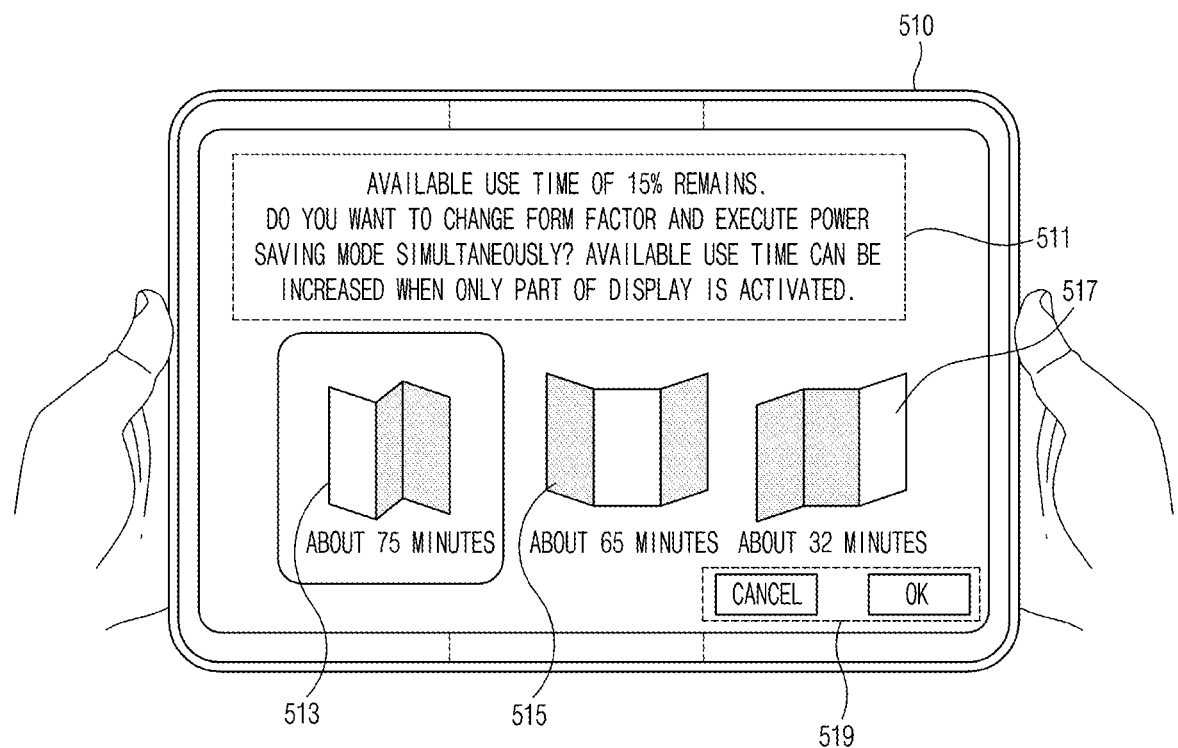
FIGS. 5A, 5B, and 5C show examples of information related to form factors of a flexible display enabling reduction in power consumption of a battery provided by an electronic device according to various example embodiments.
Figure 5B:
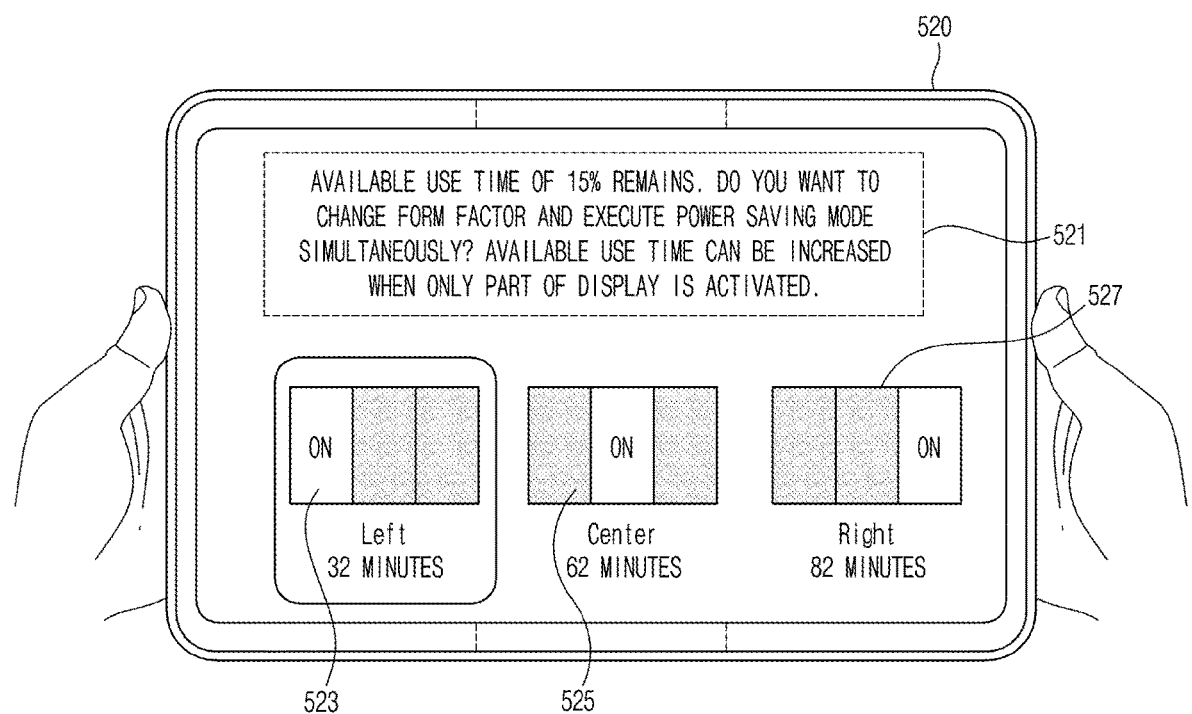
Figure 5C:
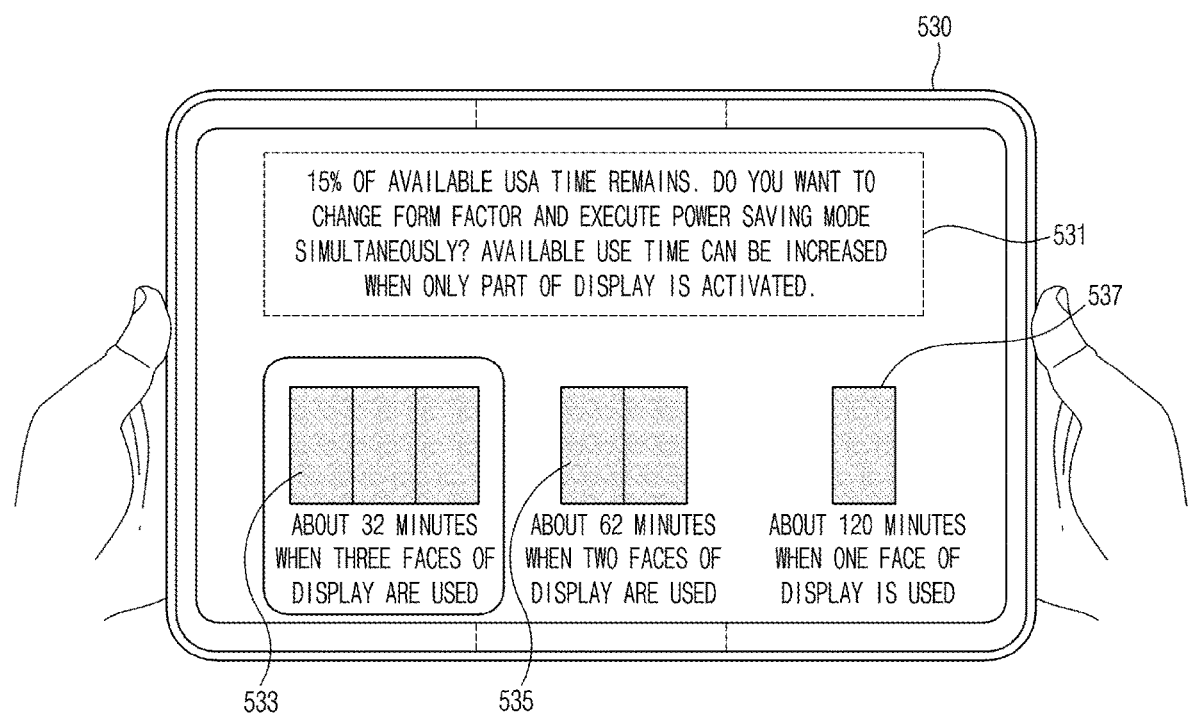

FIGS. 5A to 5C are examples of information related to form factors of a flexible display enabling reduction in power consumption of a battery provided by an electronic device (e.g., the electronic device 101 of FIG. 1 or the electronic device 200 of FIG. 2) according to various embodiments. For example, FIGS. 5A to 5C show information provided by the electronic device when the flexible display of the electronic device is divided into two areas through one folded portion.

For example, referring to FIG. 5A, the electronic device may display a window 510 indicating information related to a form factor when the remaining battery level of a battery is less than or equal to a specified value (e.g., the remaining battery level is 15%). For example, the window 510 may display a guide 511 indicating that it is possible to change a form factor or switch to a power saving mode to reduce battery consumption and increase a usable time, along with information on a remaining battery level or the usable time. For example, the window 510 may include information 513, 515, or 517 on at least one form factor enabling reduction in power consumption of a battery. For example, the information 513, 515, of 517 on the form factor may include an image representing the type of a form factor of the flexible display and information on an available battery use time for each form factor. For example, FIG. 5A shows a case of providing information 513 on a form factor in which the left area of the flexible display is turned on alone when the flexible display is folded at a certain angle, information 515 of a form factor in which the central area of the flexible display is turned on alone when the flexible display is folded at a certain angle, and information 517 of a form factor in which the right area of the flexible display is turned on alone when the flexible display is folded at a certain angle. For example, the window 510 may include an indication indicating information on a recommended form factor (e.g., 513) among the information 513, 515, and 517 on the form factors. For example, the window 510 may include a button area 519 for closing a window or confirming selection of a specific form factor.

As another example, referring to FIG. 5B, there is shown a case in which a window 520 includes a guide 521 indicating that it is possible to increase a use time of the battery using only a portion of the flexible display and information 523, 525, or 527 on at least one form factor. For example, FIG. 5B shows a case of providing information 523 on a form factor in which the left area of the flexible display is turned on alone when the flexible display is unfolded, information 525 of a form factor in which the central area of the flexible display is turned on alone when the flexible display is unfolded, and information 527 of a form factor in which the right area of the flexible display is turned on alone when the flexible display is unfolded.

As another example, referring to FIG. 5C, there is shown a case in which a window 530 includes a guide 531 indicating that it is possible to increase a use time of the battery using only a portion of the flexible display and information 533, 535, or 537 on at least one form factor. For example, in FIG. 5C, there is shown the case of providing information 533 on a form factor in which all of three areas of the flexible display are used, information 535 on a form factor in which two of the three areas of the flexible display are used, and information 537 on a form factor in which one of the three areas of the flexible display is used alone.

According to various embodiments, the types of information on the form factor provided by the electronic device illustrated in FIGS. 5A to 5C are examples and are not limited to those illustrated in FIGS. 5A to 5C.

Figure 6A:
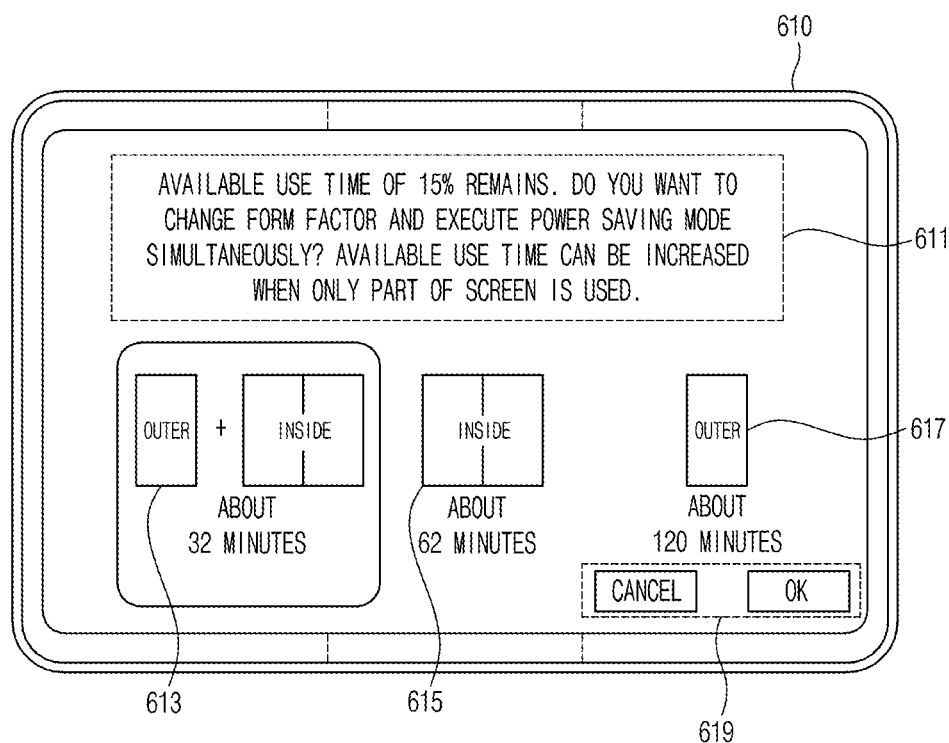
FIGS. 6A and 6B show examples of information related to form factors of a flexible display enabling reduction in power consumption of a battery provided by an electronic device according to various example embodiments.
Figure 6B:
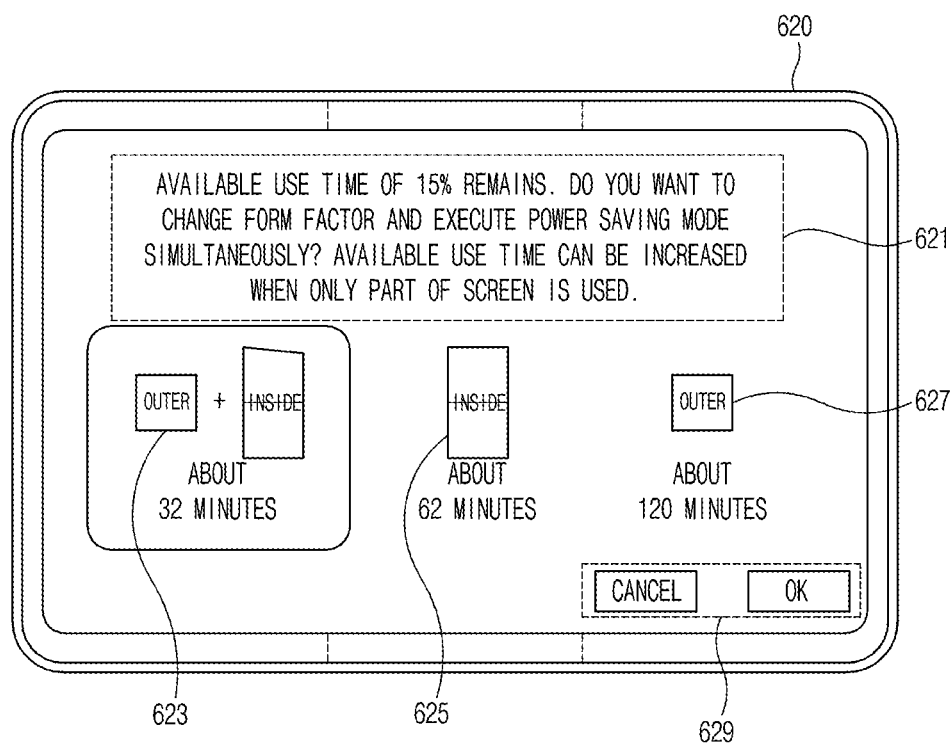

FIGS. 6A to 6B are examples of information related to form factors of a flexible display enabling reduction in power consumption of a battery provided by an electronic device (e.g., the electronic device 101 of FIG. 1 or the electronic device 200 of FIG. 2) according to various embodiments. For example, FIGS. 6A and 6B illustrate information provided by an electronic device when the electronic device includes a flexible display (inner display) and a sub-display (outer display) which are divided into two areas. For example, FIG. 6A shows a case where the flexible display (inner display) is folded left and right along a long axis, and FIG. 6B shows a case where the flexible display (inner display) is folded up and down along a short axis.

Referring to FIGS. 6A and 6B, the electronic device may display a window 610 or 620 indicating information related to a form factor when the remaining battery level of a battery is less than or equal to a specified value (e.g., the remaining battery level is 15%). For example, the window 610 or 620 may display a guide 611 or 621 indicating that it is possible to change a form factor (e.g., use a portion of a display) or switch to a power saving mode to reduce battery consumption and increase a usable time, along with information on a remaining battery level or the usable time. For example, the window 610 or 620 may include information 613, 615, 617, 623, 625, or 627 on at least one form factor enabling reduction in power consumption of a battery and a button area 619 or 629. For example, FIGS. 6A and 6B show a case in which the electronic device provides information 613 or 623 on a form factor in which the inner and outer displays are both used, information 615 or 625 on a form factor in which the inner display is used alone, and information 617 or 627 on a form factor in which the outer display is used alone.

According to various embodiments, the types of information on the form factor provided by the electronic device illustrated in FIGS. 6A and 6B are examples and are not limited to those illustrated in FIGS. 6A and 6B.

Figure 7:
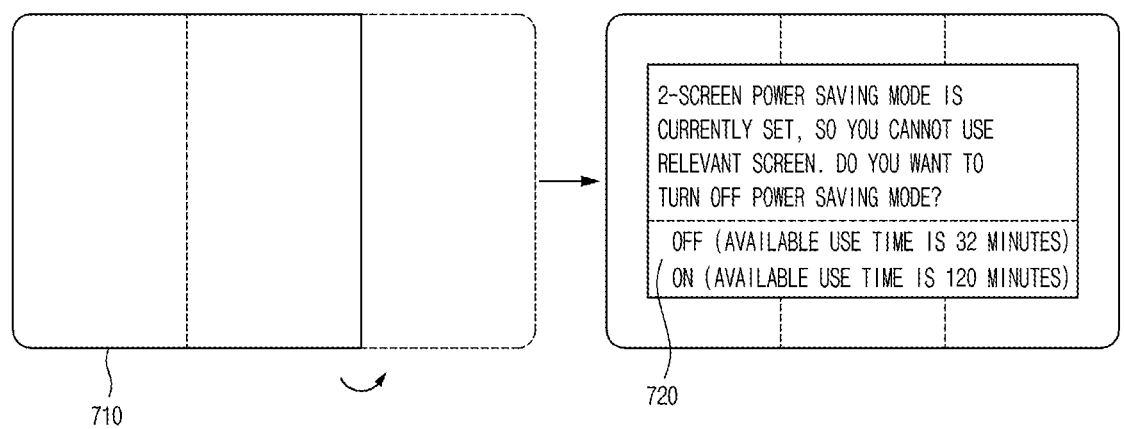
FIG. 7 is a diagram for describing an operation of an electronic device according to an example embodiment.

FIG. 7 is a diagram for describing an operation of an electronic device according to an embodiment.

According to an embodiment, an electronic device (e.g., the electronic device 101 of FIG. 1 or the electronic device 200 of FIG. 2) may provide battery-related information when a form factor of a flexible display is changed. For example, it is assumed that the electronic device includes a flexible display capable of being folded into three areas. When a user tries to unfold the flexible display 710 while using a portion of the flexible display in a state in which the flexible display is folded, the electronic device may provide information on a current mode of the electronic device (e.g., a power saving mode) and output a window 720 notifying that there is a need to release the power saving mode. For example, when the form factor of the flexible display is changed, the electronic device may output information indicating that an available use time of the battery may be reduced when the form factor is changed.

Figure 8:
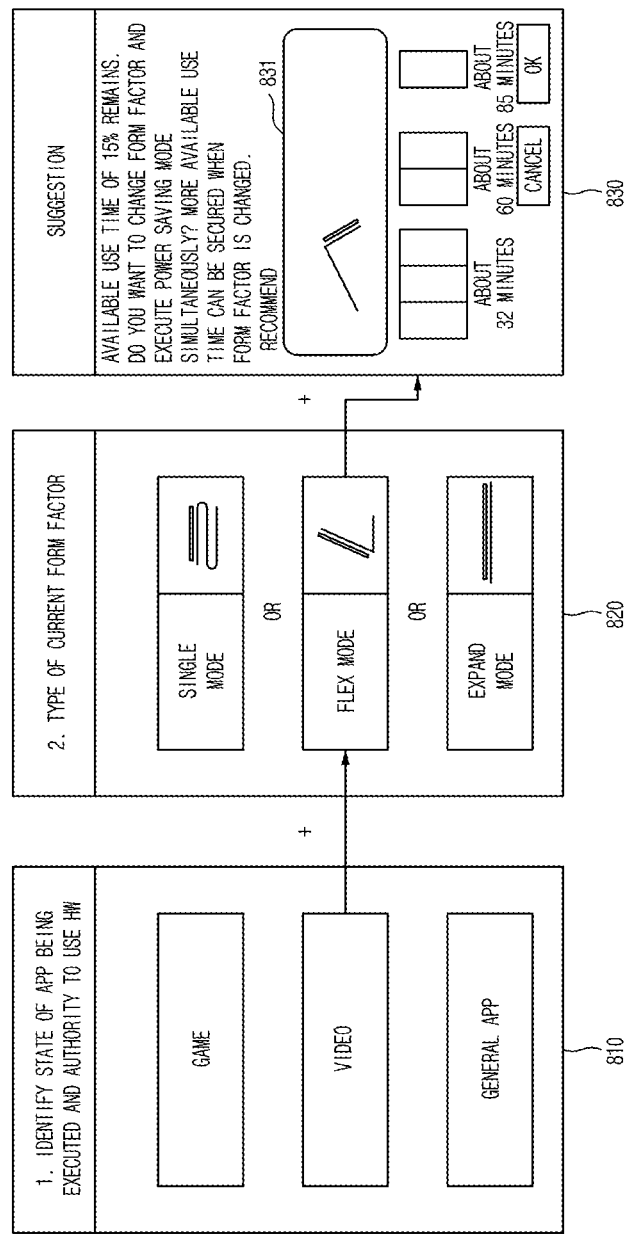
FIG. 8 is a diagram for describing an operation of an electronic device according to an example embodiment.

FIG. 8 is a diagram for describing an operation of an electronic device according to an embodiment.

According to an embodiment, in operation 810, an electronic device (e.g., the electronic device 101 of FIG. 1 or the electronic device 200 of FIG. 2) may identify a state of an application being executed and authority to use a hardware component (e.g., a sensor) of the electronic device used by the application. For example, a game application may use a gyro sensor, a video-related application may not use a sensor, and a general application may use a sensor (e.g., a camera).

According to an embodiment, in operation 820, the electronic device may recognize the form factor of a flexible display. For example, when the electronic device is a flexible display capable of being folded at multiple points (e.g., a foldable display), the flexible display may have form factors of a single mode (a mode in which only a portion of the flexible display is used in a state in which the flexible display is completely folded), a flexible mode (a mode in which the flexible display is partially used in a state in which the flexible display is folded at a certain angle), and an expand mode (flex mode).

According to an embodiment, in operation 830, the electronic device may provide information related to at least one form factor enabling reduction in power consumption of a battery based on the state of an application being executed and authority to use a hardware component. For example, the information related to the form factor may include information on a recommended form factor and/or an available use time of a battery for each form factor. For example, the electronic device may provide information on an available use time of the battery for each of sizes of use areas in the flexible display.

For example, when an application being executed is a video-related application, the use of any sensor may not be necessary. For example, the electronic device may recommend a form factor 831 capable of using a smaller area of the flexible display than a current use area in displaying the video-related application.

For example, the electronic device may provide (or recommend) information related to a form factor capable of providing the function of a corresponding hardware component based on a state of an application being executed and the authority to use the hardware component. For example, when an application being executed has authority to use a camera, information related to a form factor using an area of the flexible display where the camera is disposed may be provided.

Figure 9A:
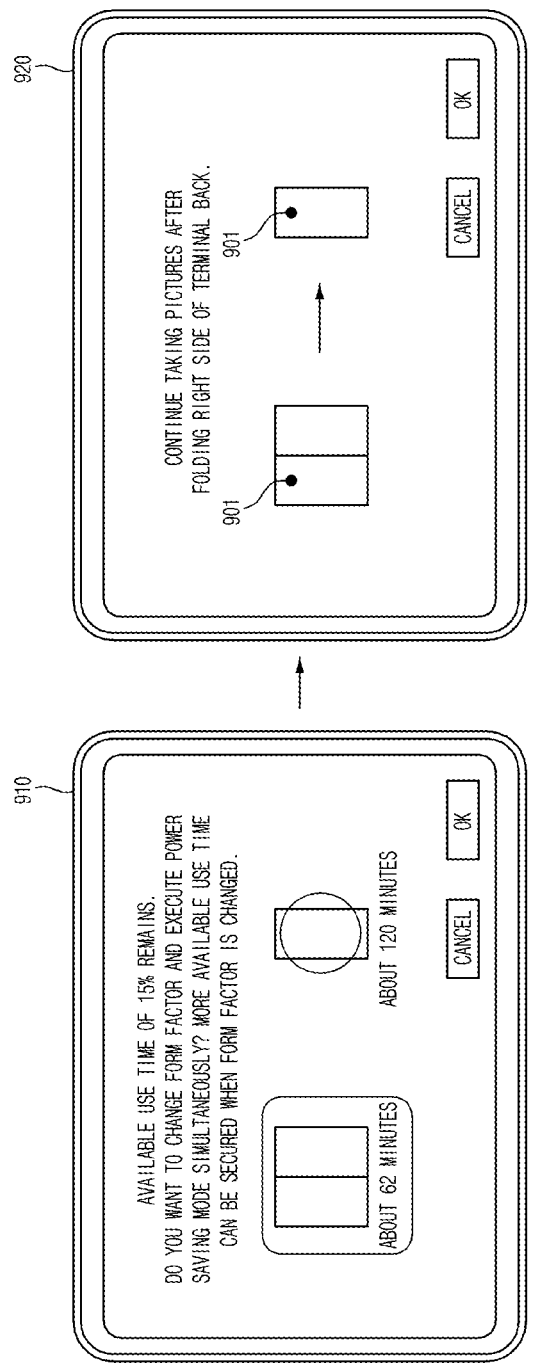
FIGS. 9A and 9B show examples of information related to form factors of a flexible display enabling reduction in power consumption of a battery provided by an electronic device according to various example embodiments.
Figure 9B:
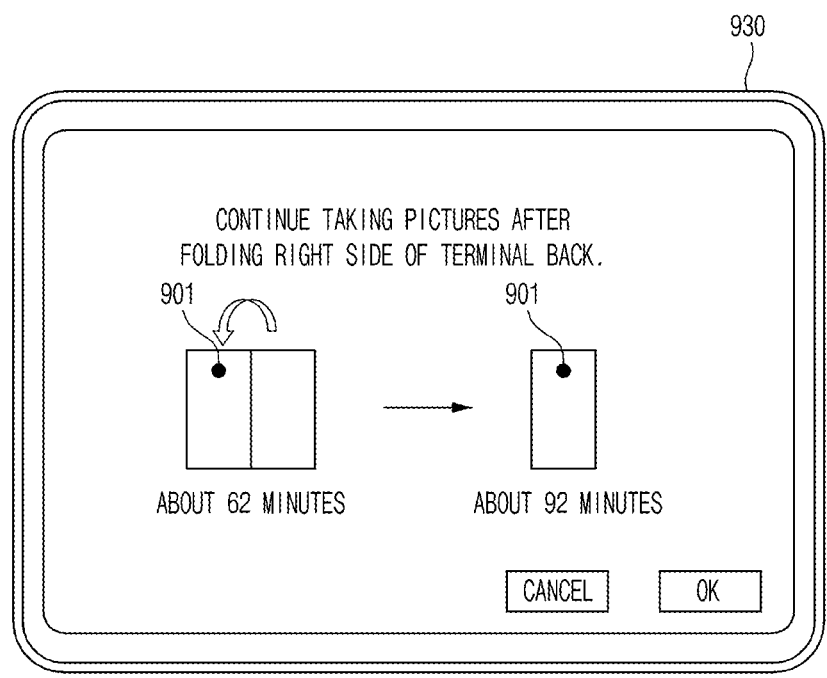

FIGS. 9A to 9B are examples of information related to form factors of a flexible display enabling reduction in power consumption of a battery provided by an electronic device (e.g., the electronic device 101 of FIG. 1 or the electronic device 200 of FIG. 2) according to various embodiments. For example, FIGS. 9A and 9B show a case in which a camera (photography) application is being executed. For example, a camera application may use a hardware component (e.g., camera) such as 901 shown in FIG. 9A.

Referring to FIG. 9A, an electronic device may display a window 910 or 920 including information related to a form factor enabling reduction in power consumption of a battery when a remaining battery level is less than a specified value (e.g., 15%) while the camera application is being used. For example, the window 910 may provide information related to the form of a flexible display and available use time of the battery, and the window 920 may provide a position of a hardware component (e.g., camera) used in a camera application, a method of changing a form factor, and a guide for use of the hardware component. For example, the electronic device may sequentially provide the window 910 and the window 920.

Referring to FIG. 9B, the electronic device may provide a window 930 including information on a method for changing a form factor and a guide for use of the hardware component in relation to the form of the flexible display, the available use time of the battery, and the position of the hardware component (e.g., camera) used in the camera application.

According to an embodiment, the electronic device may deactivate at least one hardware component (e.g., sensor) that is not necessarily used by an application (e.g., a camera application) being executed to reduce power consumption of the battery when the form factor of the flexible display is changed. For example, the electronic device may deactivate sensors other than the camera. According to an embodiment, when the form factor of the flexible display is changed, the electronic device may deactivate a function (e.g., GPS) unrelated to an application being executed (e.g., a camera application) to reduce power consumption of the battery.

Figure 10A:
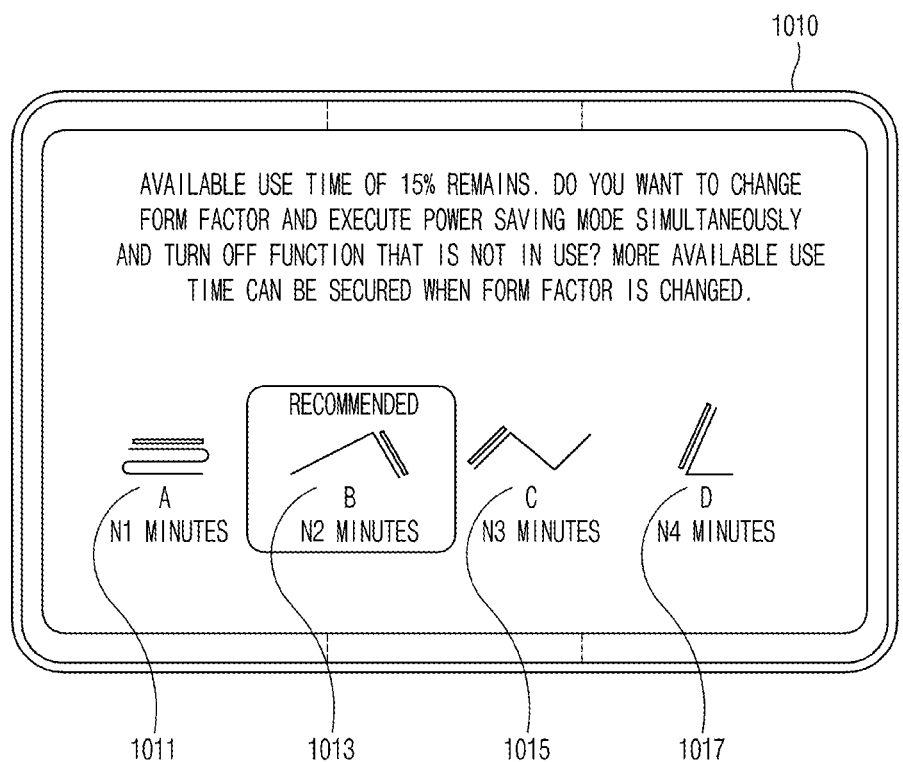
FIGS. 10A and 10B show examples of information related to form factors of a flexible display enabling reduction in power consumption of a battery provided by an electronic device according to various example embodiments.
Figure 10B:
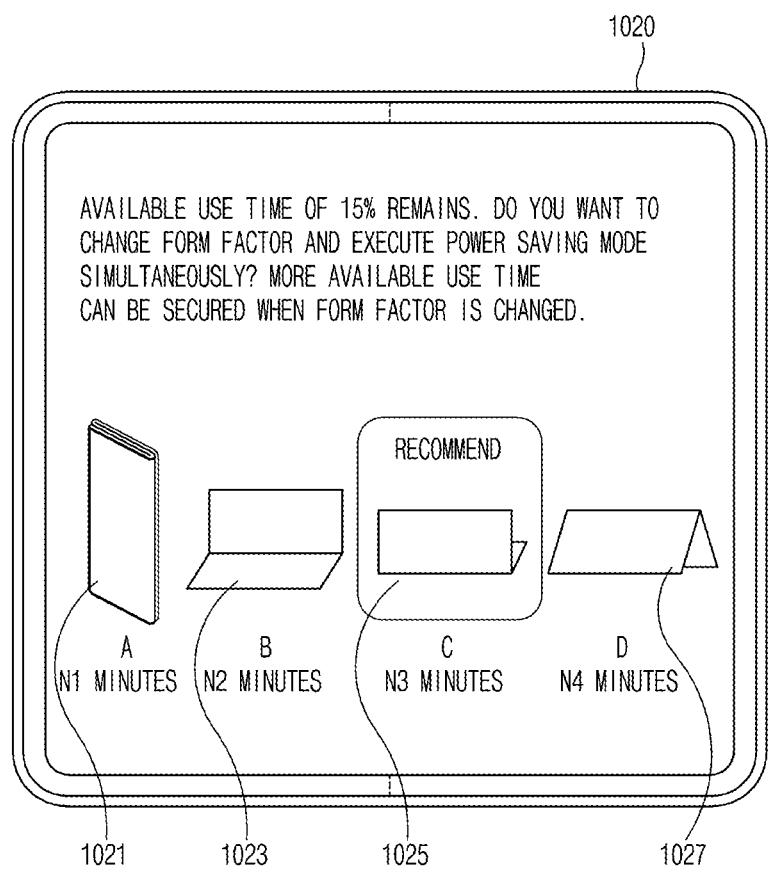

FIGS. 10A to 10B are examples of information related to form factors of a flexible display enabling reduction in power consumption of a battery provided by an electronic device (e.g., the electronic device 101 of FIG. 1 or the electronic device 200 of FIG. 2) according to various embodiments. For example, FIGS. 10A and 10B show a case in which a content playback application (e.g., a video application or an e-book application) is being executed. For example, a content playback application may use an illuminance sensor.

Referring to FIG. 10A, there is shown a case in which information 1010 related to at least one form factor enabling reduction in power consumption of a battery is provided in an electronic device including a flexible display folded in at least two portions. For example, the electronic device may recommend one form factor 1013 together with information 1011, 1013, 1015, or 1017 related to at least one form factor (e.g., form factor type and battery use time).

Referring to FIG. 10B, there is shown a case in which information 1020 related to at least one form factor enabling reduction in power consumption of a battery is provided in an electronic device including a flexible display folded in one portion. For example, the electronic device may recommend one form factor 1025 together with information 1021, 1023, 1025, or 1027 related to at least one form factor.

According to an embodiment, the electronic device may deactivate other hardware components than a hardware component (e.g., sensor) used by the content playback application being executed to reduce power consumption of a battery when a form factor of the flexible display is changed.

Figure 11A:
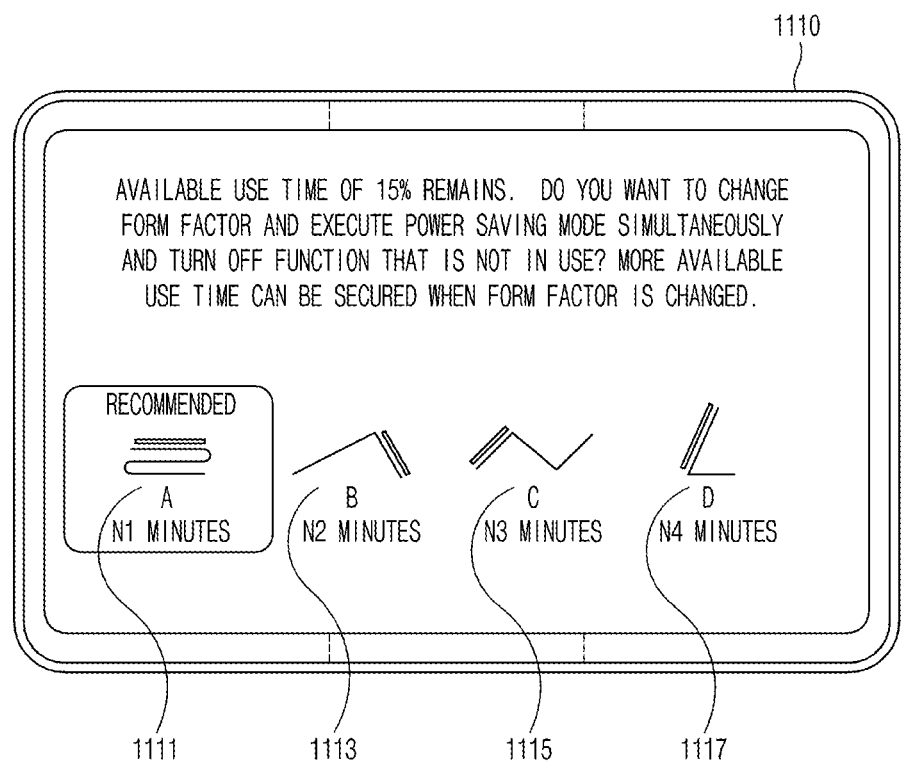
FIGS. 11A and 11B show examples of information related to form factors of a flexible display enabling reduction in power consumption of a battery provided by an electronic device according to various example embodiments.
Figure 11B:
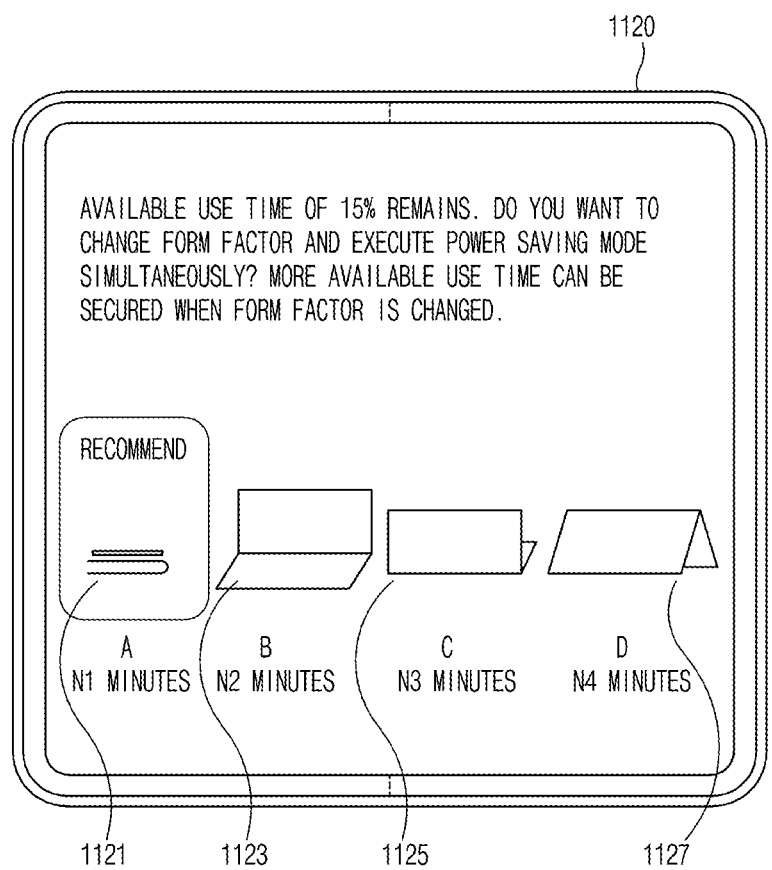

FIGS. 11A to 11B are examples of information related to form factors of a flexible display enabling reduction in power consumption of a battery provided by an electronic device (e.g., the electronic device 101 of FIG. 1 or the electronic device 200 of FIG. 2) according to various embodiments. For example, FIGS. 11A and 11B show a case in which a game application is being executed. For example, a game application may use at least one sensor (e.g., a gyro sensor, an illuminance sensor, and/or a geomagnetic sensor).

Referring to FIG. 11A, there is shown a case in which information 1110 related to at least one form factor enabling reduction in power consumption of a battery is provided in an electronic device including a flexible display folded in at least two portions. For example, the electronic device may recommend one form factor 1111 together with information 1111, 1113, 1115, and 1117 related to the at least one form factor (e.g., form factor type and battery use time).

Referring to FIG. 11B, there is shown a case in which information 1120 related to at least one form factor enabling reduction in power consumption of a battery is provided in an electronic device including a flexible display folded in one portion. For example, the electronic device may recommend one form factor 1121 together with information 1121, 1123, 1125, or 1127 related to at least one form factor.

According to an embodiment, the electronic device may deactivate other hardware components or functions than a hardware component (e.g., a gyro sensor, an illuminance sensor, and/or a geomagnetic sensor) used by the game application being executed to reduce power consumption of a battery when a form factor of the flexible display is changed.

Figure 12A:
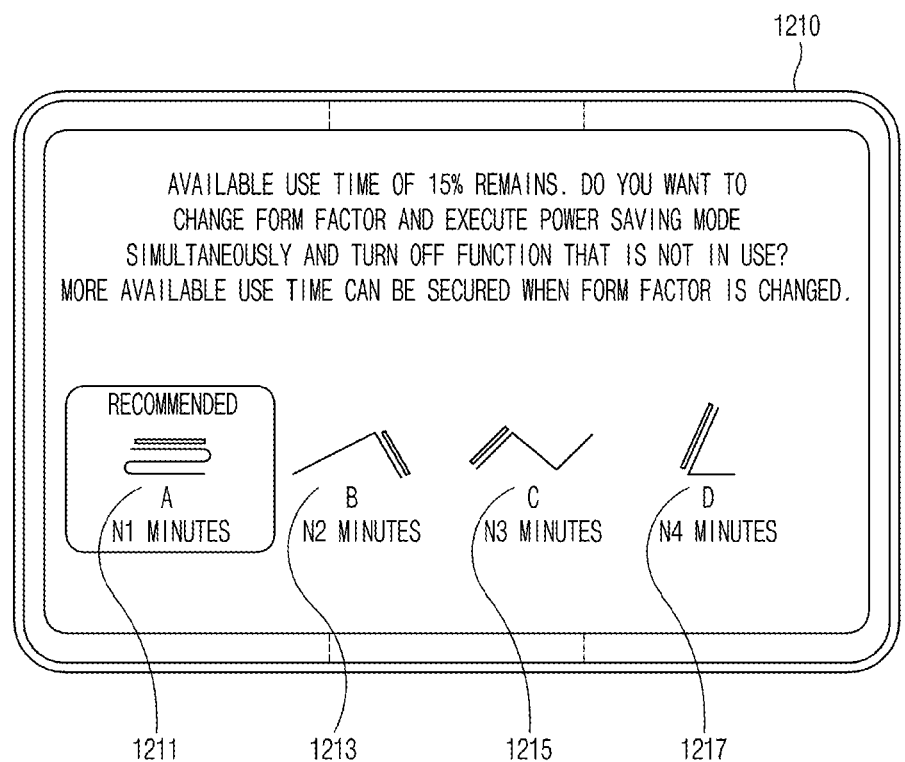
FIGS. 12A and 12B show examples of information related to form factors of a flexible display enabling reduction in power consumption of a battery provided by an electronic device according to various example embodiments.
Figure 12B:
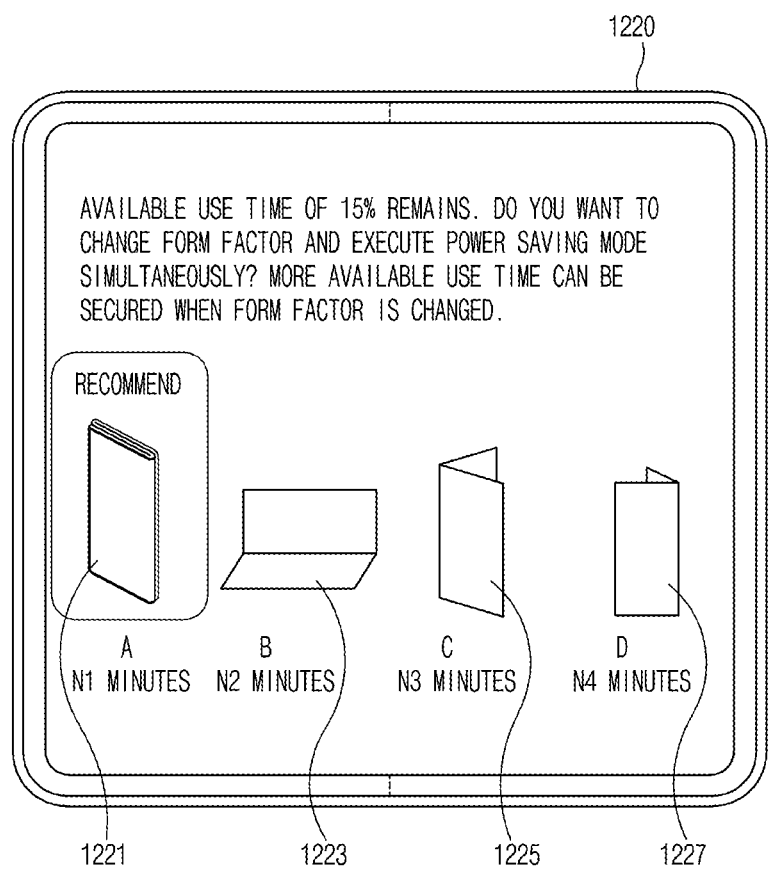

FIGS. 12A to 12B are examples of information related to form factors of a flexible display enabling reduction in power consumption of a battery provided by an electronic device (e.g., the electronic device 101 of FIG. 1 or the electronic device 200 of FIG. 2) according to various embodiments. For example, FIGS. 12A and 12B show a case in which an SNS application (e.g., an IM application or a browser application) is being executed. For example, the SNS application (or the IM application or the browser application) may use at least one sensor (e.g., an illuminance sensor) and output content in a portrait view by default.

Referring to FIGS. 12A and 12B, there is shown a case in which information 1210 or 1220 related to at least one form factor enabling reduction in power consumption of a battery is provided in an electronic device including a flexible display folded in at least two portions. For example, the electronic device may recommend one form factor 1211 or 1221 together with information 1211, 1213, 1215, 1217, 1221, 1223, 1225, or 1227 related to the at least one form factor (e.g., form factor type and battery use time). According to an embodiment, the electronic device may recommend a form factor based on the type or characteristics of an application being executed. For example, when the SNS application (or IM application or browser application) being executed supports a portrait view by default, the electronic device may recommend the form factor 1211 or 1221 suitable for the portrait view.

According to an embodiment, the electronic device may deactivate other hardware components or functions (e.g., audio output) than a hardware component (e.g., illuminance sensor) used by the SNS application (or IM application or browser application) being executed to reduce power consumption of a battery when a form factor of the flexible display is changed.

Figure 13A:
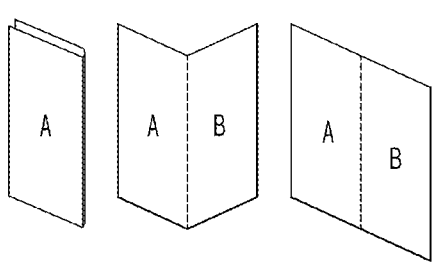
FIGS. 13A and 13B are diagrams for describing an operation of an electronic device according to an example embodiment.
Figure 13B:
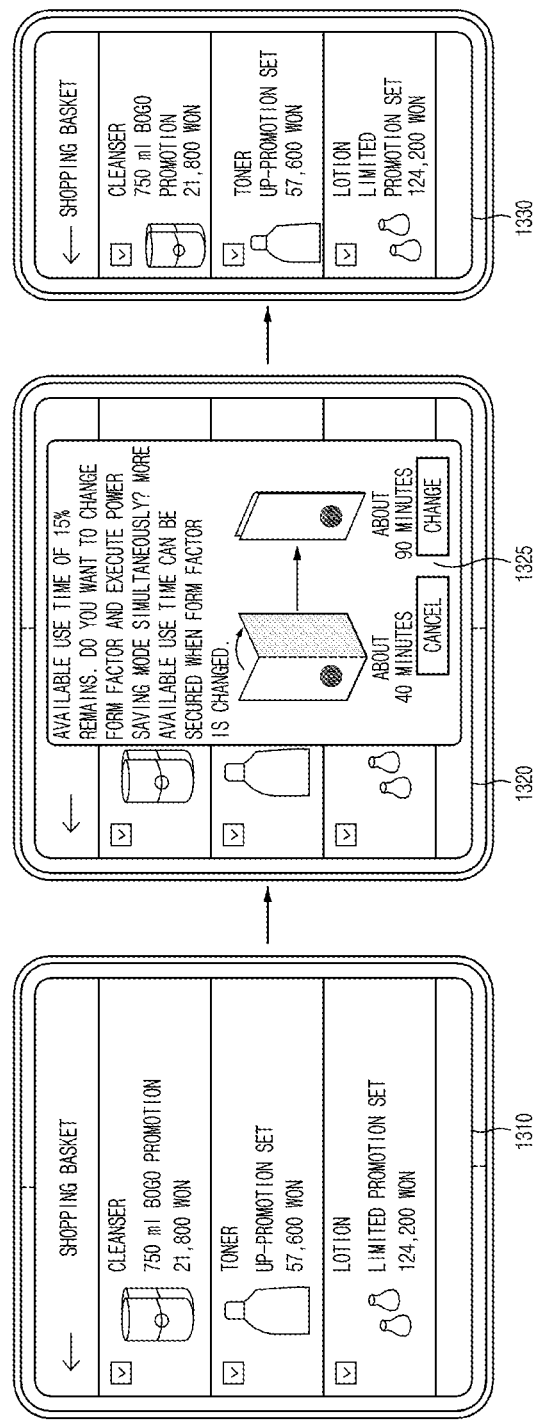

FIGS. 13A and 13B are diagrams for describing an operation of an electronic device (e.g., the electronic device 101 of FIG. 1 or the electronic device 200 of FIG. 2) according to an embodiment. For example, FIGS. 13A and 13B show a case in which a shopping application is being executed in an electronic device including a foldable display capable of being divided into areas "A" and "B" with respect to a folding point. For example, a shopping application may have authority to use a fingerprint recognition sensor. For example, it is assumed that an acceleration/gyro sensor, a first illuminance sensor, and a fingerprint recognition sensor are disposed in the area "A", and a camera sensor, a second illuminance sensor, and a proximity sensor are disposed in the area "B".

According to an embodiment, the electronic device may recognize that the remaining battery level is less than a specified value (e.g., 15%) while displaying a shopping application screen 1310. For example, the electronic device may output a window 1325 including information related to at least one form factor enabling reduction in power consumption of the battery on a shopping application screen 1320 based on an application being executed and a hardware component (e.g., a fingerprint recognition sensor) used by the application being executed when the remaining battery capacity is less than or equal to a specified value. For example, the electronic device may reduce power consumption of the battery and provide information related to at least one form factor including an area "A" where a fingerprint recognition sensor used in a shopping application is disposed. For example, the information related to the form factor may include information on a method for changing a form factor, an available battery use time, and a position of a hardware component (e.g., a fingerprint recognition sensor) used by an application being executed.

According to an embodiment, when the form factor of the flexible display is changed based on a user input or manual operation of the user, the electronic device may output a screen 1330 of the shopping application corresponding to the changed form factor.

According to various embodiments, arrangement of hardware (e.g., a sensor) included in the electronic device, types of the form factor of the flexible display, types of an application being executed, and/or authority to use the hardware are not limited to those shown in FIGS. 13A and 13B.

Figure 14A:
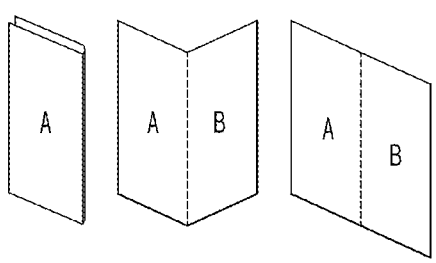
FIGS. 14A and 14B are diagrams for describing an operation of an electronic device according to an example embodiment.
Figure 14B:
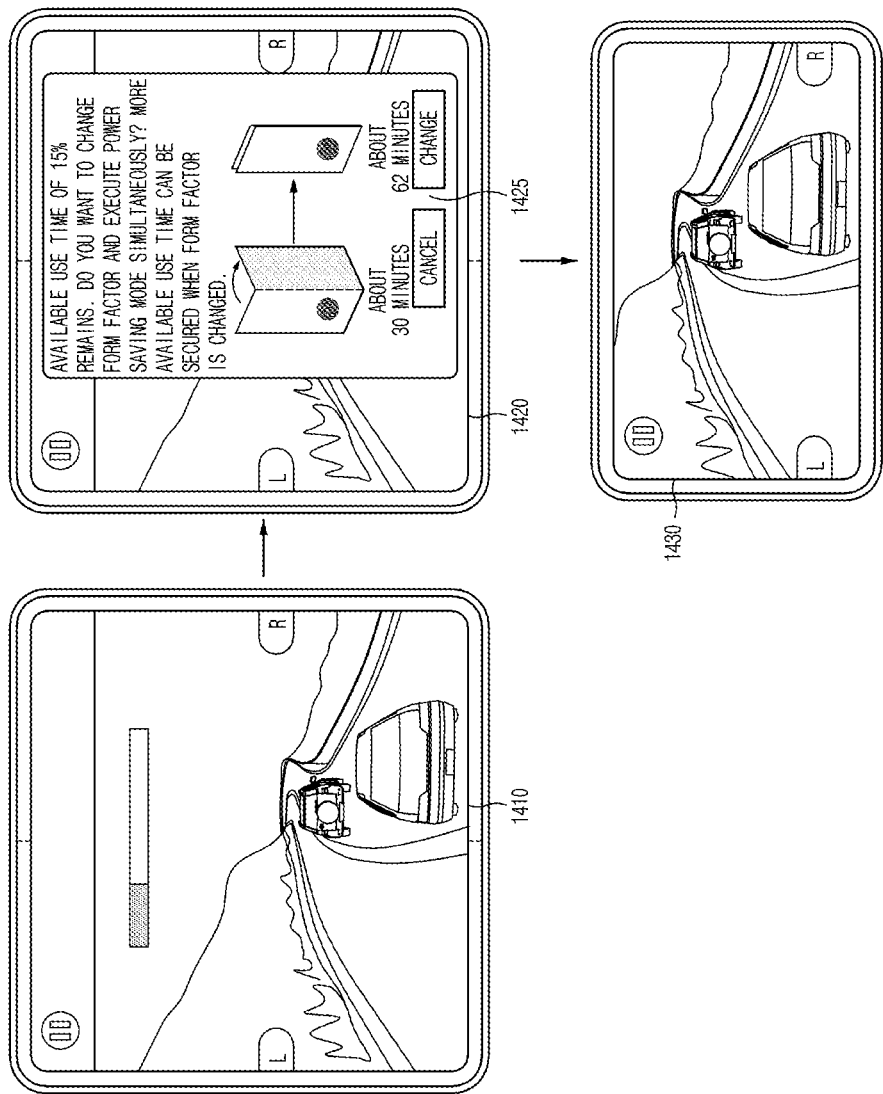

FIGS. 14A and 14B are diagrams for describing an operation of an electronic device (e.g., the electronic device 101 of FIG. 1 or the electronic device 200 of FIG. 2) according to an embodiment. For example, FIGS. 14A and 14B show a case in which a game application is being executed in an electronic device including a foldable display capable of being divided into areas "A" and "B" around a folding point. For example, the game application may have authority to use an acceleration/gyro sensor. For example, it is assumed that an acceleration/gyro sensor, a first illuminance sensor, and a fingerprint recognition sensor are disposed in the area "A", and a camera sensor, a second illuminance sensor, and a proximity sensor are disposed in the area "B".

According to an embodiment, the electronic device may recognize that the remaining battery level is less than a specified value (e.g., 15%) while displaying a game application screen 1410. For example, the electronic device may output a window 1425 including information related to at least one form factor enabling reduction in power consumption of the battery on a game application screen 1420 based on an application being executed and a hardware component (e.g., an acceleration/gyro sensor) used by the application being executed when the remaining battery capacity is less than or equal to a specified value. For example, the electronic device may reduce power consumption of the battery and provide information related to at least one form factor including an area "A" where an acceleration/gyro sensor used in the game application is disposed. For example, the information related to the form factor may include information on a method for changing a form factor, an available battery use time, and a position of a hardware component (e.g., a fingerprint recognition sensor) used by an application being executed. According to an embodiment, the electronic device may provide information on at least one form factor based on an aspect ratio of content (e.g., a landscape view or a portrait view) supported by an application being executed by default. For example, the electronic device may provide information on a form factor corresponding to a landscape view when the application being executed supports the landscape view by default, and provide information on a form factor corresponding to a portrait view when the application being executed supports a portrait view by default.

According to an embodiment, when the form factor of the flexible display is changed based on a user input or manual operation of the user, the electronic device may output a screen 1430 of the game application corresponding to the changed form factor.

According to various embodiments, arrangement of hardware (e.g., a sensor) included in the electronic device, types of the form factor of the flexible display, types of an application being executed, and/or authority to use the hardware are not limited to those shown in FIGS. 14A and 14B.

Figure 15A:
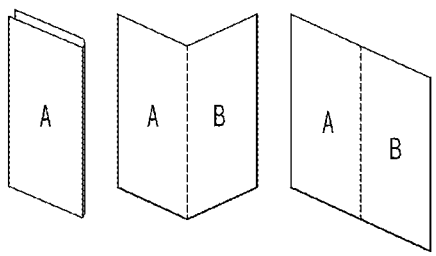
FIGS. 15A and 15B are diagrams for describing an operation of an electronic device according to an example embodiment.
Figure 15B:
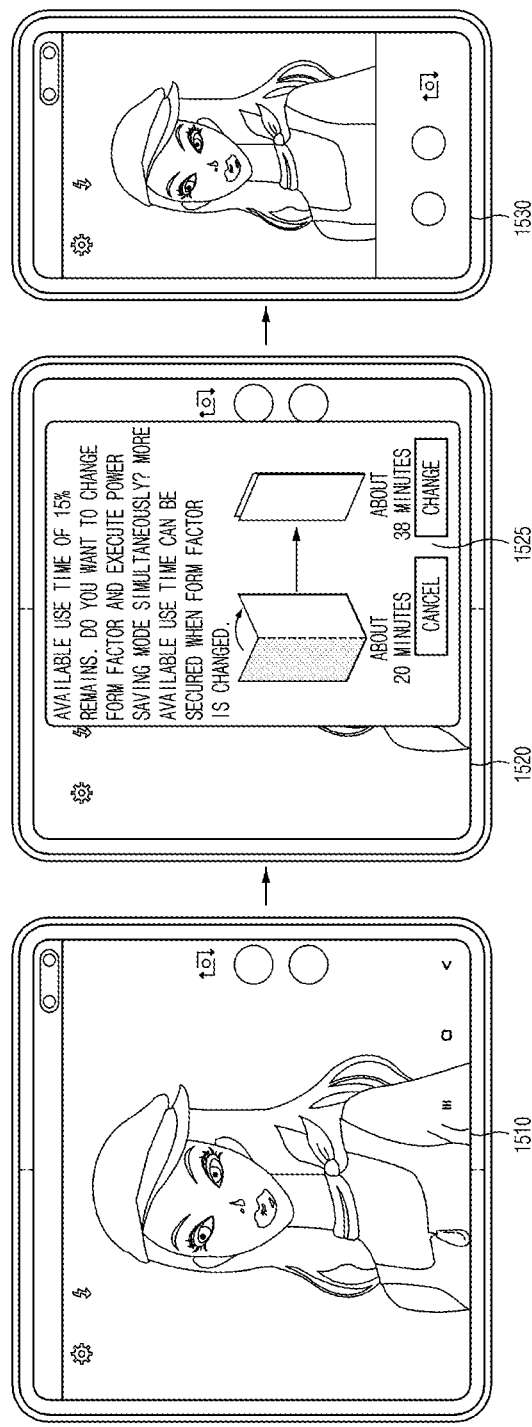

FIGS. 15A and 15B are diagrams for describing an operation of an electronic device (e.g., the electronic device 101 of FIG. 1 or the electronic device 200 of FIG. 2) according to an embodiment. For example, FIGS. 15A and 15B show a case in which a camera application is being executed in an electronic device including a foldable display capable of being divided into areas "A" and "B" around a folding point. For example, the camera application may have authority to use a camera. For example, it is assumed that an acceleration/gyro sensor, a first illuminance sensor, and a fingerprint recognition sensor are disposed in the area "A", and a camera sensor, a second illuminance sensor, and a proximity sensor are disposed in the area "B".

According to an embodiment, the electronic device may recognize that the remaining battery level is less than a specified value (e.g., 15%) while displaying a camera application screen 1510. For example, the electronic device may output a window 1525 including information related to at least one form factor enabling reduction in power consumption of the battery on a camera application screen 1520 based on an application being executed and a hardware component (e.g., a camera) used by the application being executed when the remaining battery capacity is less than or equal to a specified value. For example, the electronic device may provide information related to at least one form factor enabling reduction in power consumption of the battery and including the area "B" where the camera used in the camera application is disposed. For example, the information related to the form factor may include information on a method for changing a form factor, an available battery use time, and a position of a hardware component (e.g., a camera) used by an application being executed.

According to an embodiment, when the form factor of the flexible display is changed based on a user input or manual operation of the user, the electronic device may output a screen 1530 of the camera application corresponding to the changed form factor.

According to various embodiments, arrangement of hardware (e.g., a sensor) included in the electronic device, types of the form factor of the flexible display, types of an application being executed, and/or authority to use the hardware are not limited to those shown in FIGS. 15A and 15B.

Figure 16A:
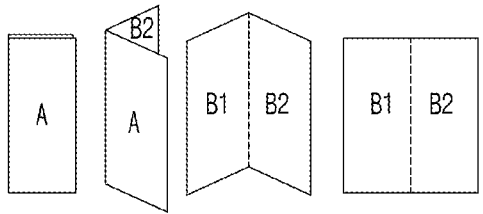
FIGS. 16A and 16B are diagrams for describing an operation of an electronic device according to an example embodiment.
Figure 16B:
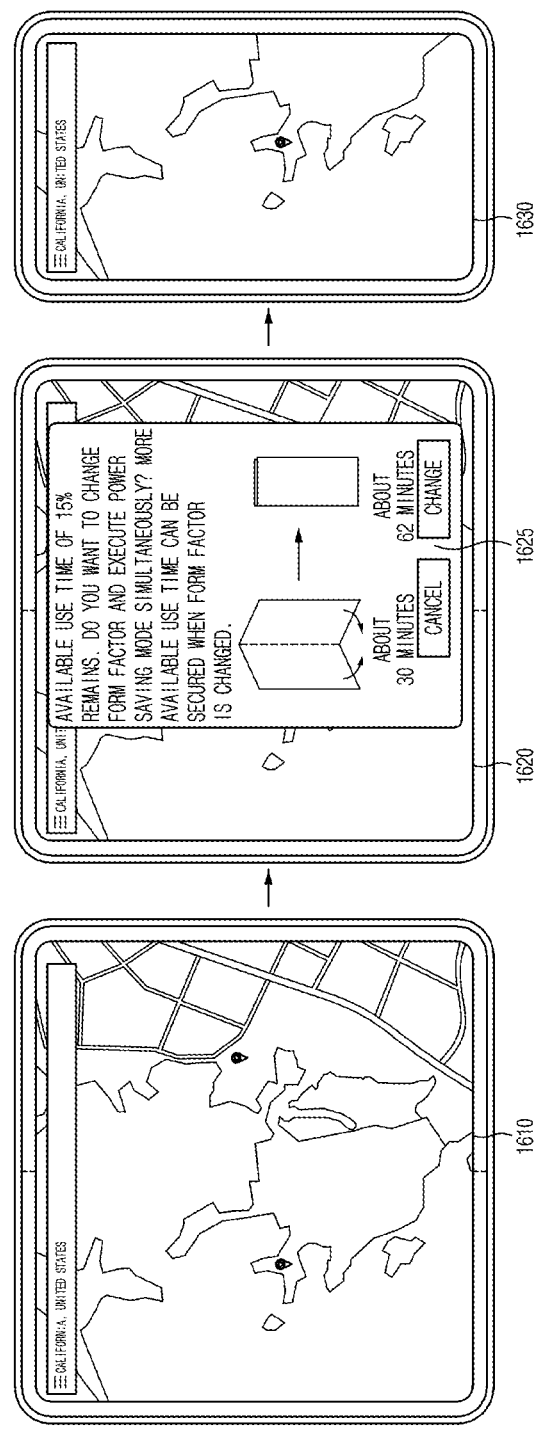

FIGS. 16A and 16B are diagrams for describing an operation of an electronic device (e.g., the electronic device 101 of FIG. 1 or the electronic device 200 of FIG. 2) according to an embodiment. For example, FIGS. 16A and 16B show a case in which a map application is being executed in an electronic device including an outer sub-display (front display) (area "A") and a foldable display capable of being divided into areas B1 and B2 with respect to a folding point. For example, the map application may have authority to use a geomagnetic sensor. For example, it may be assumed that an outer camera, a rear camera, a geomagnetic sensor, a third illuminance sensor, and a microphone are disposed in the area "A", a barometric pressure sensor, a first acceleration/gyro sensor, and a first illuminance sensor are disposed in the area B1, and an inner camera, a second acceleration/gyro sensor, and a second illuminance sensor are disposed in the area B2.

According to an embodiment, the electronic device may recognize that the remaining battery level is less than a specified value (e.g., 15%) while displaying a map application screen 1610. For example, the electronic device may output a window 1625 including information related to at least one form factor enabling reduction in power consumption of the battery on a map application screen 1620 based on an application being executed and a hardware component (e.g., a geomagnetic sensor) used by the application being executed when the remaining battery capacity is less than or equal to a specified value. For example, the electronic device may provide information related to at least one form factor enabling reduction in power consumption of the battery and including the area "A" where the geomagnetic sensor used in the map application is disposed. For example, the information related to the form factor may include information on a method for changing a form factor, an available battery use time, and a position of a hardware component (e.g., a geomagnetic sensor) used by an application being executed.

According to an embodiment, when the form factor of the flexible display is changed based on a user input or manual operation of the user, the electronic device may output a screen 1630 of the map application corresponding to the changed form factor.

According to various embodiments, arrangement of hardware (e.g., a sensor) included in the electronic device, types of the form factor of the flexible display, types of an application being executed, and/or authority to use the hardware are not limited to those shown in FIGS. 16A and 16B.

Figure 17A:
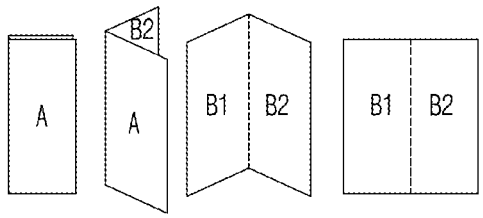
FIGS. 17A and 17B are diagrams for describing an operation of an electronic device according to an example embodiment.
Figure 17B:
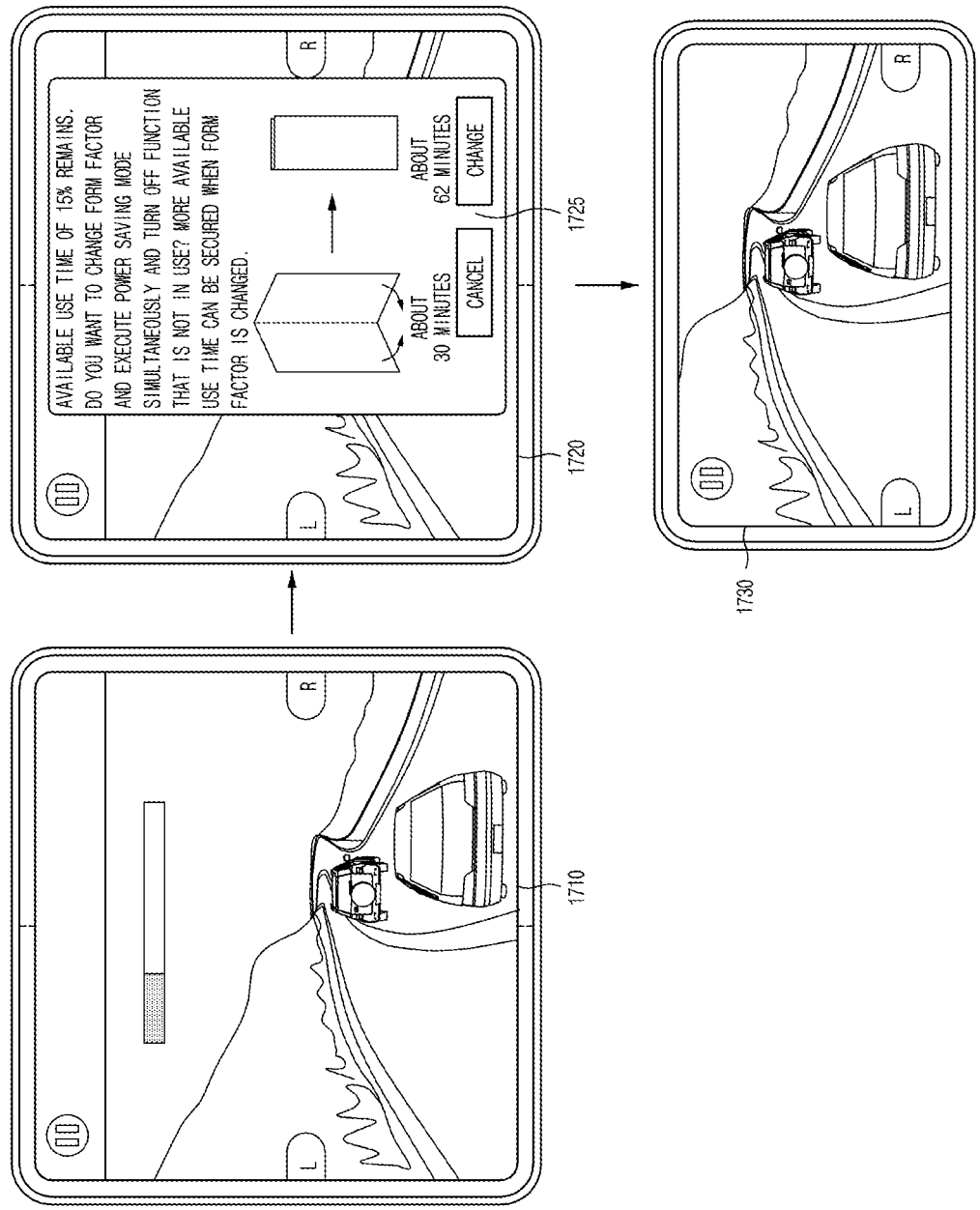

FIGS. 17A and 17B are diagrams for describing an operation of an electronic device (e.g., the electronic device 101 of FIG. 1 or the electronic device 200 of FIG. 2) according to an embodiment. For example, FIGS. 17A and 17B show a case in which a game application is being executed in an electronic device including an outer sub-display (front display) (area "A") and a foldable display capable of being divided into areas B1 and B2 with respect to a folding point. For example, the game application may have authority to use an acceleration/geomagnetic sensor. For example, it may be assumed that an outer camera, a rear camera, a geomagnetic sensor, a third illuminance sensor, and a microphone are disposed in the area 'A", a barometric pressure sensor, a first acceleration/gyro sensor, and a first illuminance sensor are disposed in the area B1, and an inner camera, a second acceleration/gyro sensor, and a second illuminance sensor are disposed in area B2.

According to an embodiment, the electronic device may recognize that the remaining battery level is less than a specified value (e.g., 15%) while displaying a game application screen 1710. For example, the electronic device may output a window 1725 including information related to at least one form factor enabling reduction in power consumption of the battery on a game application screen 1720 based on an application being executed and a hardware component (e.g., an acceleration/gyro sensor) used by the application being executed when the remaining battery capacity is less than or equal to a specified value. For example, the electronic device may provide information related to at least one form factor enabling reduction in power consumption of the battery and including the area B1 where a first acceleration/gyro sensor used in the game application is disposed and the area B2 where a second acceleration/gyro sensor is disposed.

For example, the information related to the form factor may include information on a method for changing a form factor, an available battery use time, and a position of a hardware component (e.g., an acceleration/gyro sensor) used by an application being executed.

According to an embodiment, when the form factor of the flexible display is changed based on a user input or manual operation of the user, the electronic device may output a screen 1730 of the game application corresponding to the changed form factor.

According to various embodiments, arrangement of hardware (e.g., a sensor) included in the electronic device, types of the form factor of the flexible display, types of an application being executed, and/or authority to use the hardware are not limited to those shown in FIGS. 17A and 17B.

Figure 18A:
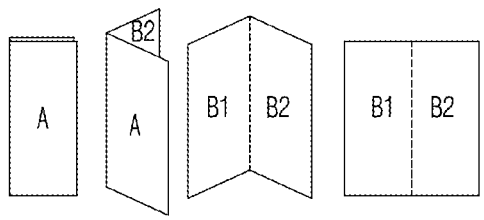
FIGS. 18A and 18B are diagrams for describing an operation of an electronic device according to an embodiment.
Figure 18B:
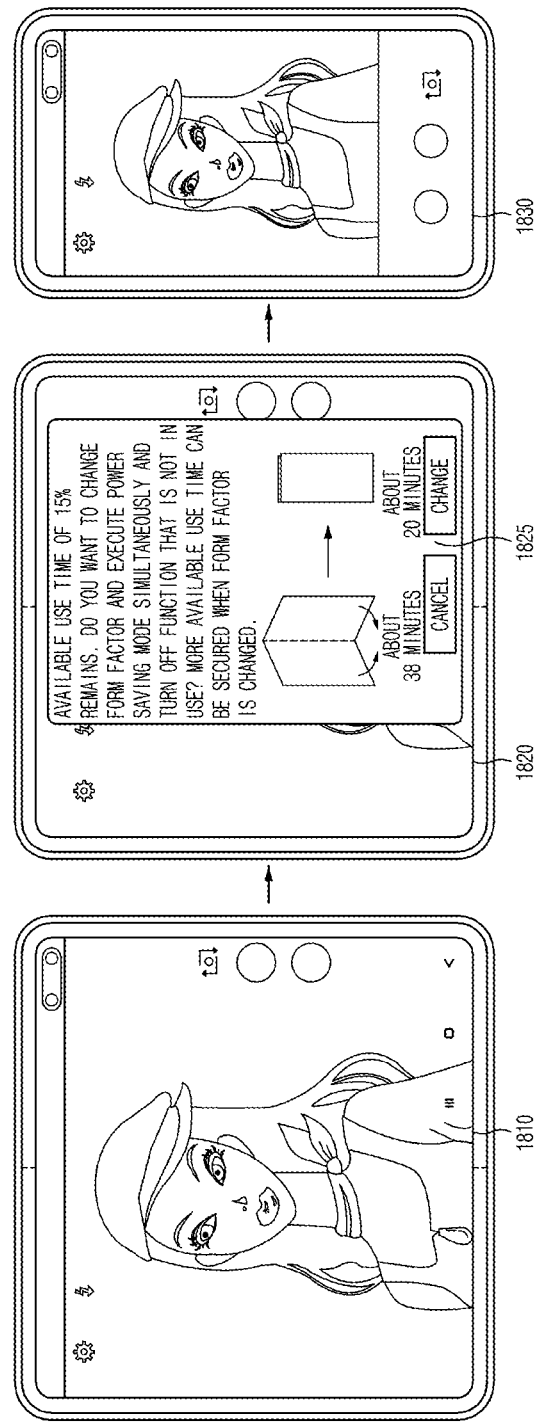

FIGS. 18A and 18B is a diagram for describing an operation of an electronic device according to an embodiment. For example, FIGS. 18A and 18B show a case in which a camera application is being executed in an electronic device including an outer sub-display (front display) (area "A") and a foldable display capable of being divided into areas B1 and B2 with respect to a folding point. For example, the camera application may have authority to use an image sensor (e.g., camera). For example, it may be assumed that an outer camera, a rear camera, a geomagnetic sensor, a third illuminance sensor, and a microphone are disposed in the area "A", a barometric pressure sensor, a first acceleration/gyro sensor, and a first illuminance sensor are disposed in the area B1, and an inner camera, a second acceleration/gyro sensor, and a second illuminance sensor are disposed in the area B2.

According to an embodiment, the electronic device may recognize that the remaining battery level is less than a specified value (e.g., 15%) while displaying a camera application screen 1810. For example, the electronic device may output a window 1825 including information related to at least one form factor enabling reduction in power consumption of the battery on a camera application screen 1820 based on an application being executed and a hardware component (e.g., an outer camera and/or inner camera) used by the application being executed when the remaining battery capacity is less than or equal to a specified value. For example, the electronic device may provide information related to at least one form factor enabling reduction in power consumption of the battery and including the area "A" where the outer camera used in the camera application is disposed and the area B2 where the inner camera is disposed. For example, the information related to the form factor may include information on a method for changing a form factor, an available battery use time, and a position of a hardware component (e.g., inner camera or outer camera) used by an application being executed.

According to an embodiment, when the form factor of the flexible display is changed based on a user input or manual operation of the user, the electronic device may output a screen 1830 of the camera application corresponding to the changed form factor.

According to various embodiments, arrangement of hardware (e.g., a sensor) included in the electronic device, types of the form factor of the flexible display, types of an application being executed, and/or authority to use the hardware are not limited to those shown in FIGS. 18A and 18B.

Figure 19B:
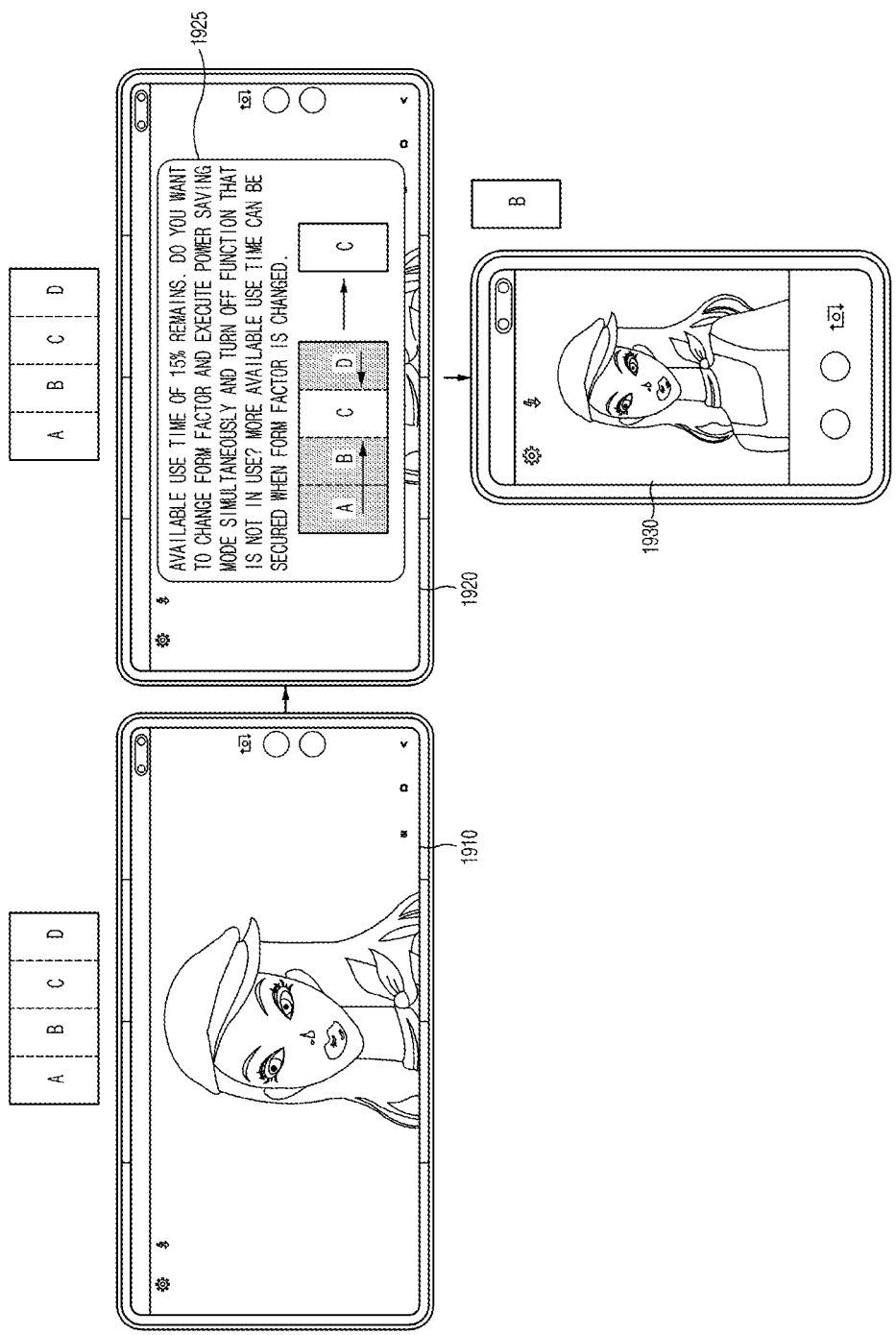

FIGS. 19A and 19B are diagrams for describing an operation of an electronic device (e.g., the electronic device 101 of FIG. 1 or the electronic device 200 of FIG. 2)

according to an embodiment. For example, FIGS. 19A and 19B show a case in which a camera application is being executed in an electronic device including a slidable display (or a rollable display) capable of divided into areas "A", area "B", area "C", and area "D" through expansion and contraction. For example, the camera application may have authority to use an image sensor (e.g., camera). For example, it may be assumed that an outer camera, a rear camera, a geomagnetic sensor, a third illuminance sensor, and a microphone are disposed in the area "A", an inner camera, a barometric pressure sensor, a first acceleration/gyro sensor, and a first illuminance sensor are disposed in the area 'B", a second acceleration/gyro sensor, and a second illuminance sensor are disposed in the area "C", and a third acceleration/gyro sensor and a third illuminance sensor are disposed in the area "D".

According to an embodiment, the electronic device may recognize that the remaining battery level is less than a specified value (e.g., 15%) while displaying a camera application screen 1910. For example, the electronic device may output a window 1925 including information related to at least one form factor enabling reduction in power consumption of the battery on a camera application screen 1920 based on an application being executed and a hardware component (e.g., an outer camera and/or inner camera) used by the application being executed when the remaining battery capacity is less than or equal to a specified value. For example, the electronic device may provide information related to at least one form factor reducing power consumption of the battery and the area "A" in which the outer camera used in the camera application is disposed and the area "B" in which the inner camera is disposed. For example, the information related to the form factor may include information on a method for changing a form factor, an available battery use time, and a position of a hardware component (e.g., inner camera or outer camera) used by an application being executed.

According to an embodiment, when the form factor of the flexible display is changed based on a user input or manual operation of the user, the electronic device may output a screen 1930 of the camera application corresponding to the changed form factor. For example, the screen 1930 shows a case where there is a changed to have a form factor using the area "B" of the flexible display alone.

According to various embodiments, arrangement of hardware (e.g., a sensor) included in the electronic device, types of the form factor of the flexible display, types of an application being executed, and/or authority to use the hardware are not limited to those shown in FIGS. 19A and 19B.

Figure 20A:
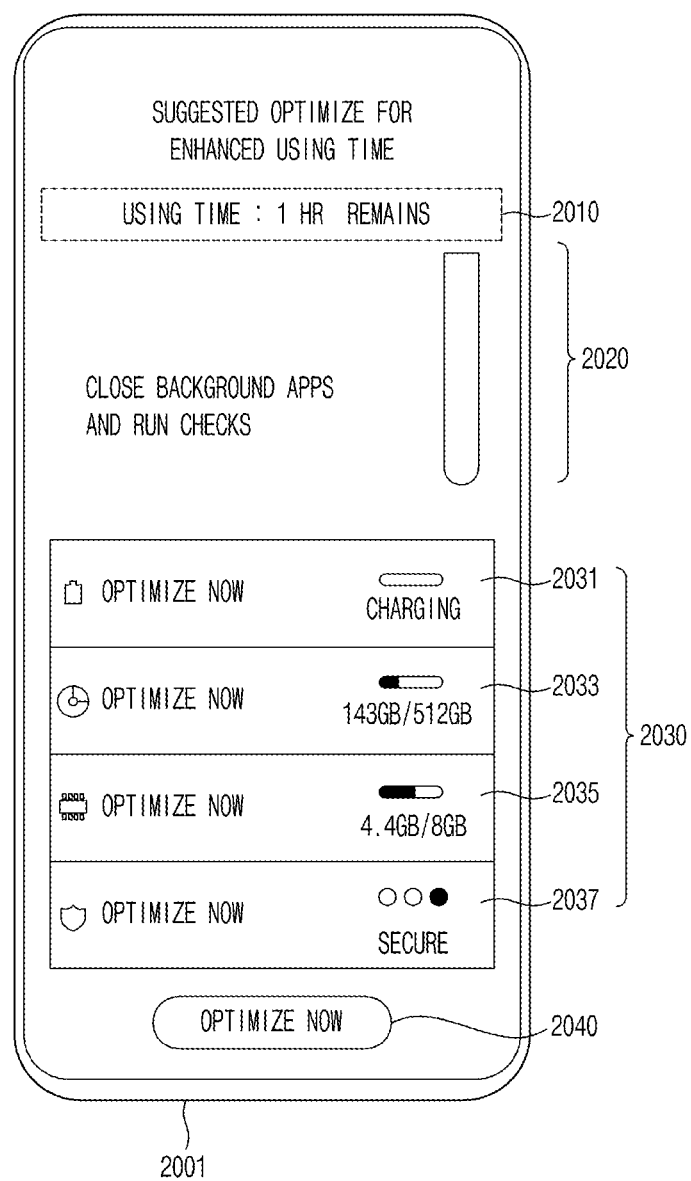
FIGS. 20A and 20B are diagrams for describing an operation of an electronic device according to an example embodiment.
Figure 20B:
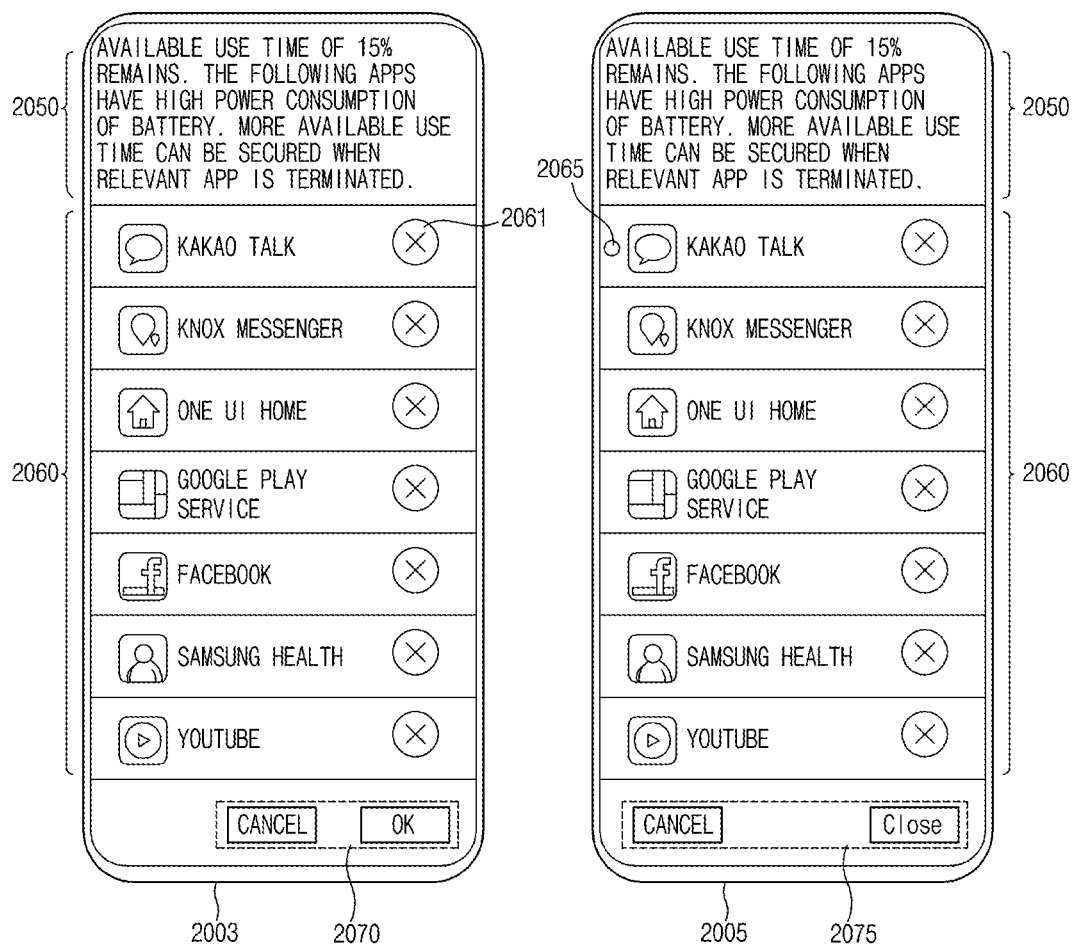

FIGS. 20A and 20B are diagrams for describing an operation of an electronic device (e.g., the electronic device 101 of FIG. 1 or the electronic device 200 of FIG. 2) according to an embodiment.

Referring to FIG. 20A, according to an embodiment, when the remaining battery level of the battery is less than a specified value and there is no form factor of the flexible display enabling reduction in power consumption of the battery, the electronic device may provide a screen 2001 including information for optimizing the state of the electronic device. For example, the screen 2001 may include information 2010 on a remaining battery level and/or an available use time of the battery, information 2020 for managing applications being executed, and information 2030 related to the state of the electronic device, and a button 2040 for executing optimization of the electronic device. According to various embodiments, the optimization of the electronic device may include an operation of terminating an application being unnecessarily executed or an application having a large battery consumption.

According to an embodiment, the information 2030 related to the state of the electronic device may include battery state information 2031, storage state information 2033, memory state information 2035, and security state information 2037.

According to an embodiment, the user may perform optimization of the electronic device to reduce battery power consumption based on the information included in the screen 2001.

Referring to FIG. 20B, when the remaining battery level of the battery is less than a specified value and there is no form factor of the flexible display enabling reduction in power consumption of the battery, the electronic device may provide a screen 2003 or 2005 including information on the use state of an application being executed. According to an embodiment, the screen 2003 or 2005 may include an area 2050 providing a remaining battery level and a guide for reducing battery power consumption, a list 2060 of applications being executed, and a button area 2070 of 2075 for closing the screen 2003 or 2005 or determining application selection. According to an embodiment, the list 2060 of applications being executed may include a button 2061 capable of terminating each application or a button 2065 capable of selecting each application.

According to an embodiment, the electronic device may terminate the execution of the application selected on the screen 2003 or 2005 based on a user input. For example, the electronic device may terminate execution of an application corresponding to the end button 2061 receiving the user input. For example, the electronic device may select applications corresponding to the selection button 2065 at which the user input is received, and collectively terminate at least one application for which the selection has been determined, based on the user input received in the button area 2070 or 2075.

An electronic device (e.g., the electronic device 101 of FIG. 1 or the electronic device 200 of FIG. 2) according to an embodiment may include a flexible display; a battery; a memory; and a processor operatively connected, directly or indirectly, to the flexible display, the battery, and the memory. According to an embodiment, the memory may store instructions, which, when executed, cause the processor to identify a current form factor of the flexible display when a remaining battery level of the battery is less than or equal to a specified value, determine at least one form factor of the flexible display enabling reduction in power consumption of the battery, and provide information related to the at least one form factor of the flexible display.

According to an embodiment, the electronic device may further include at least one sensor, and the instructions may cause the processor to recognize a currently activated sensor and determine the at least one form factor enabling reduction in power consumption of the battery based on a position of the activated sensor.

According to an embodiment, the instructions may cause the processor to determine the at least one form factor enabling reduction in power consumption of the battery based on at least a part of an application and a function being executed.

According to an embodiment, the instructions may cause the processor to recognize an aspect ratio of content being displayed on the flexible display and determine the at least one form factor enabling reduction in power consumption of the battery based on the recognized aspect ratio.

According to an embodiment, the information related to the at least one form factor may include information on an expected available use time of the battery for each of the at least one form factor.

According to an embodiment, the instructions may cause the processor to provide information on use states of applications being currently executed when there is no form factor of the flexible display enabling reduction in power consumption of the battery, and terminate execution of an application selected based on a user input among the applications being currently executed.

According to an embodiment, the instructions may cause the processor to change the flexible display to have a form factor selected by a user input based on the user input for selecting one of the at least one form factor.

According to an embodiment, the instructions may cause the processor to switch a mode of the electronic device from a normal mode to a power saving mode when the form factor of the flexible display is changed.

According to an embodiment, the electronic device may further include a sub-display, and the instructions may cause the processor to identify current form factors of the flexible display and the sub-display when a remaining battery level of the battery is less than or equal to a specified value, determine a form factor of at least one of the flexible display and the sub-display enabling reduction in power consumption of the battery, and provide information related to the determined form factor of at least one of the flexible display and the sub-display.

According to an embodiment, the flexible display may include at least one of a foldable display, a slidable display, and a rollable display.

Figure 21:
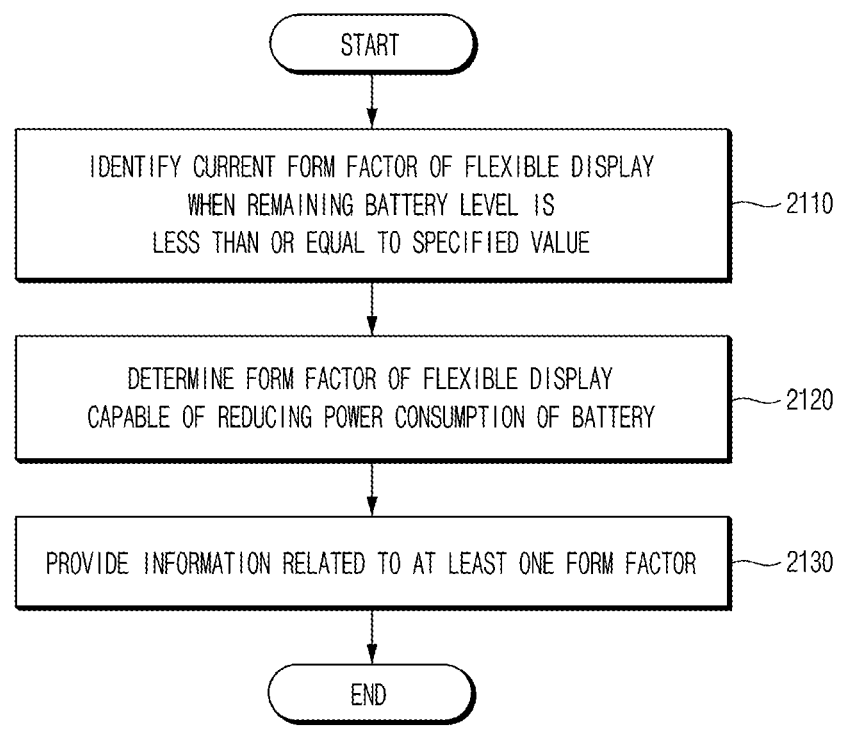
FIG. 21 is a flowchart of an operation method of an electronic device according to an example embodiment.

FIG. 21 is a flowchart of an operation method of an electronic device according to an embodiment.

According to an embodiment, in operation 2110, an electronic device (e.g., the electronic device 101 of FIG. 1 or the electronic device 200 of FIG. 2) may identify a current form factor of a flexible display when a remaining battery level of the electronic device is less than or equal to a specified value. For example, the electronic device may determine whether the flexible display 210 is currently in an unfolded state, a folded state, an expanded state, or a contracted state. According to various embodiments, operation 2110 may be performed when it is recognized that the form factor of the flexible display is changed while the remaining battery level of a battery is less than or equal to a specified value. For example, when a user tries to change the form factor of the flexible display in a case where the remaining battery level is less than the specified value, the electronic device may determine that the user's intention is to save battery power consumption, and in this case, in operation 2110, recognize the current form factor and then perform operations 2120 and 2130.

According to an embodiment, the electronic device may determine at least one form factor of the flexible display 210 enabling reduction in power consumption of the battery. For example, the electronic device may determine at least one form factor enabling reduction in power consumption of the battery from among various form factors that the flexible display is able to have. According to various embodiments, the electronic device may determine a form factor of the flexible display enabling reduction in power consumption of the battery while maintaining an operation or function of the electronic device.

According to an embodiment, the electronic device may determine a form factor enabling reduction in power consumption of the battery based on a position of an activated sensor of the electronic device. For example, a sensor included in the electronic device may be disposed at a specific position of the electronic device. For example, the electronic device may determine a form factor enabling reduction in power consumption of the battery while maintaining the function (operation) of the activated sensor. For example, the electronic device may determine a form factor using a portion of the flexible display corresponding to the position of the activated sensor.

According to an embodiment, the electronic device may determine a form factor enabling reduction in power consumption of the battery based on at least a part of an application and function being executed. For example, the electronic device may determine a hardware component (e.g., sensor) corresponding to a function used by an application being executed, and determine a form factor suitable for performing the function of the corresponding hardware component. For example, the electronic device may determine a form factor based on the type of an application being executed. For example, the electronic device may determine a form factor suitable for an application based on whether the application is an application that supports a portrait view by default or an application that natively supports a landscape view by default.

According to an embodiment, the electronic device may recognize a display ratio of content being displayed on the flexible display and determine a form factor enabling reduction in power consumption of the battery based on the recognized display ratio. For example, the electronic device may determine a form factor enabling reduction in power consumption of the battery while allowing the aspect ratio of content being displayed to remain the same or change similarly.

According to an embodiment, when the electronic device includes a plurality of displays (e.g., the flexible display and a sub-display), the electronic device may identify current form factors of all the plurality of displays, and then determine at least one form factor enabling reduction in power consumption of the battery among various form factors configurable through a plurality of displays.

According to an embodiment, in operation 2130, the electronic device may provide information related to the determined at least one form factor. For example, the electronic device may output information related to the determined at least one form factor through the flexible display. According to an embodiment, information related to the form factor may include information on an expected use time of the battery for each form factor.

According to an embodiment, the electronic device may provide information on a method for reducing power consumption of the battery when there is no form factor of the flexible display enabling reduction in power consumption of the battery. For example, the electronic device may provide information on a use state of an application being executed and terminate execution of the selected application based on a user input.

According to an embodiment, the electronic device may change the form factor of the flexible display to a selected form factor based on a user input for selecting one of at least one form factor enabling reduction in power consumption of the battery. For example, the electronic device may fold, unfold, expand or contract the form of the flexible display to have a form factor selected by a user input.

According to an embodiment, the electronic device may switch the mode of the electronic device to a power save mode in the case of changing the form factor of the flexible display. According to an embodiment, in the power saving mode, the electronic device may have a lower brightness or resolution or processing speed (e.g., CPU speed) of the flexible display than that in the normal mode, or restrict or deactivate at least some functions or operations of at least some components of the electronic device.

According to an embodiment, a method for operating an electronic device (e.g., the electronic device 101 of FIG. 1 or the electronic device 200 of FIG. 2) may include identifying a current form factor of the flexible display when a remaining battery level of the battery is less than or equal to a specified value, determining at least one form factor of the flexible display enabling reduction in power consumption of the battery, and providing information related to the at least one form factor of the flexible display.

According to an embodiment, the determining of the at least one form factor may include recognizing a currently activated sensor and determining the at least one form factor enabling reduction in power consumption of the battery based on a position of the activated sensor.

According to an embodiment, the determining of the at least one form factor may include determining the at least one form factor enabling reduction in power consumption of the battery based on at least a portion of an application and a function being executed.

According to an embodiment, the determining of the at least one form factor may include recognizing an aspect ratio of content being displayed on the flexible display and determining the at least one form factor enabling reduction in power consumption of the battery based on the recognized aspect ratio.

According to an embodiment, the information related to the at least one form factor may include information on an expected available use time of the battery for each of the at least one form factor.

According to an embodiment, the method may further include providing information on use states of applications being currently executed and terminating execution of an application selected based on a user input among the applications being currently executed, when there is no form factor of the flexible display enabling reduction in power consumption of the battery.

According to an embodiment, the method may further include changing the flexible display to have a form factor selected by a user input based on the user input selecting one of the at least one form factor. "Based on" as used herein covers based at least on.

According to an embodiment, the method may further include switching a mode of the electronic device from a normal mode to a power saving mode when the form factor of the flexible display is changed.

According to an embodiment, the electronic device may further include a sub-display, and the method may further include identifying current form factors of the flexible display and the sub-display when a remaining battery level of the battery is less than or equal to a specified value, determining a form factor of at least one of the flexible display and the sub-display enabling reduction in power consumption of the battery, and providing information related to the determined form factor of at least one of the flexible display and the sub-display.

According to an example embodiment, a recording medium may store instructions which, when executed by an electronic device including a flexible display, cause the electronic device to identify a current form factor of the flexible display when a remaining battery level of the battery is less than or equal to a specified value, determine at least one form factor of the flexible display enabling reduction in power consumption of the battery, and provide information related to the at least one form factor of the flexible display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to Certain example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a flexible display;
a battery;
at least one processor comprising processing circuitry; and
memory storing instructions that, when executed by the at least one processor individually or collectively, cause the electronic device to:
identify a current form factor of the flexible display when a remaining battery level of the battery is less than or equal to a specified value, the current form factor corresponding to one of a plurality of different forms of the flexible display,
determine at least one form factor of the flexible display corresponding to a different one of the plurality of different forms of the flexible display and enabling reduction in power consumption of the battery, and
display information on a portion of the flexible display suggesting the at least one form factor of the flexible display.

2. The electronic device of claim 1, further comprising:
at least one sensor,
wherein the instructions, when executed by the at least one processor, cause the electronic device to:
determine the at least one form factor enabling reduction in power consumption of the battery based on a position of an activated sensor.

3. The electronic device of claim 1, wherein the instructions, when executed by the at least one processor, cause the electronic device to determine the at least one form factor enabling reduction in power consumption of the battery based on at least a portion of an application and a function being executed.

4. The electronic device of claim 1, wherein the instructions, when executed by the at least one processor, cause the electronic device to:
recognize an aspect ratio of content being displayed on the flexible display, and
determine the at least one form factor enabling reduction in power consumption of the battery based on the recognized aspect ratio.

5. The electronic device of claim 1, wherein the information related to the at least one form factor includes information on an expected available use time of the battery for each of the at least one form factor.

6. The electronic device of claim 1, wherein the instructions, when executed by the at least one processor, cause the electronic device to:
provide information on use states of applications being currently executed when there is no form factor of the flexible display enabling reduction in power consumption of the battery, and terminate execution of an application selected based on a user input among the applications being currently executed.

7. The electronic device of claim 1, wherein the instructions, when executed by the at least one processor, cause the electronic device to change the flexible display to have a form factor selected by a user input based on the user input for selecting one of the at least one form factor.

8. The electronic device of claim 7, wherein the instructions, when executed by the at least one processor, cause the electronic device to switch a mode of the electronic device from a normal mode to a power saving mode based on the form factor of the flexible display being changed.

9. The electronic device of claim 1, further comprising:
a sub-display,
wherein the instructions, when executed by the at least one processor, cause the electronic device:
identify current form factors of the flexible display and the sub-display, when the remaining battery level of the battery is less than or equal to a specified value,
determine a form factor of at least one of the flexible display and the sub-display enabling reduction in power consumption of the battery, and
provide information related to the determined form factor of at least one of the flexible display and the sub-display.

10. The electronic device of claim 1, wherein the flexible display includes at least one of a foldable display, a slidable display, and a rollable display.

11. The electronic device of claim 1, wherein the form factor includes information related to a folded or unfolded angle of the flexible display, an active area of the flexible display, and/or a display to be used when the electronic device includes a plurality of displays including the flexible display.

12. A method for operating an electronic device including a flexible display, the method comprising:
    identifying a current form factor of the flexible display based on a remaining battery level of the battery being less than or equal to a specified value, the current form factor corresponding to one of a plurality of different forms of the flexible display;
    determining at least one form factor of the flexible display corresponding to a different one of the plurality of different forms of the flexible display and enabling reduction in power consumption of the battery; and
    displaying information on a portion of the flexible display suggesting the at least one form factor of the flexible display.

13. The method of claim 12, wherein the determining of the at least one form factor includes:
    determining the at least one form factor enabling reduction in power consumption of the battery based on a position of an activated sensor.

14. The method of claim 12, wherein the determining of the at least one form factor includes determining the at least one form factor enabling reduction in power consumption of the battery based on at least a portion of an application and a function being executed.

15. The method of claim 12, wherein the determining of the at least one form factor includes:
    recognizing an aspect ratio of content being displayed on the flexible display, and
    determining the at least one form factor enabling reduction in power consumption of the battery based on the recognized aspect ratio.

16. The method of claim 12, wherein the information related to the at least one form factor includes information on an expected available use time of the battery for each of the at least one form factor.

17. The method of claim 12, further comprising:
    providing information on use states of applications being currently executed when there is no form factor of the flexible display enabling reduction in power consumption of the battery; and
    terminating execution of an application selected based on a user input among the applications being currently executed.

18. The method of claim 12, further comprising:
    changing the flexible display to have a form factor selected by a user input based on the user input selecting at least one of the at least one form factor.

19. The method of claim 18, further comprising:
    switching a mode of the electronic device from a normal mode to a power saving mode when the form factor of the flexible display is changed.

20. The method of claim 12, wherein the electronic device further includes a sub-display, and
    wherein the method further comprises:
    identifying current form factors of the flexible display and the sub-display based on at least the remaining battery level of the battery being less than or equal to a specified value;
    determining a form factor of at least one of the flexible display and the sub-display capable of reducing power consumption of the battery; and
    providing information related to the determined form factor of at least one of the flexible display and the sub-display.

21. The method of claim 12, wherein the form factor includes information related to a folded or unfolded angle of the flexible display, an active area of the flexible display, and/or a display to be used when the electronic device includes a plurality of displays including the flexible display.

22. A non-transitory recording medium having computer-readable instructions stored therein,
    wherein the instructions when executed by an electronic device including a flexible display, cause the electronic device to perform a method comprising:
    identifying a current form factor of the flexible display when a remaining battery level of the battery is less than or equal to a specified value, the current form factor corresponding to one of a plurality of different forms of the flexible display,
    determining at least one form factor of the flexible display corresponding to a different one of the plurality of different forms of the flexible display and, enabling reduction in power consumption of the battery; and
    displaying information on a portion of the flexible display suggesting the at least one form factor of the flexible display.

23. The non-transitory recording medium of claim 22, wherein the form factor includes information related to a folded or unfolded angle of the flexible display, an active area of the flexible display, and/or a display to be used when the electronic device includes a plurality of displays including the flexible display.

* * * * *